(12) United States Patent
Nefedov

(10) Patent No.: US 11,023,774 B2
(45) Date of Patent: Jun. 1, 2021

(54) CLUSTERING AND TAGGING ENGINE FOR USE IN PRODUCT SUPPORT SYSTEMS

(71) Applicant: THOMSON REUTERS ENTERPRISE CENTRE GMBH, Zug (CH)

(72) Inventor: Nikolai Nefedov, Gattikon (CH)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 182 days.

(21) Appl. No.: 16/122,809

(22) Filed: Sep. 5, 2018

(65) Prior Publication Data

US 2019/0220695 A1 Jul. 18, 2019

Related U.S. Application Data

(60) Provisional application No. 62/616,530, filed on Jan. 12, 2018.

(51) Int. Cl.
*G06F 16/00* (2019.01)
*G06N 5/00* (2006.01)
(Continued)

(52) U.S. Cl.
CPC ....... *G06K 9/6218* (2013.01); *G06F 16/2471* (2019.01); *G06F 16/24578* (2019.01);
(Continued)

(58) Field of Classification Search
CPC ...... G06Q 30/02; G06Q 30/016; G06Q 50/10; G06Q 10/10; G06Q 10/06311;
(Continued)

(56) References Cited

U.S. PATENT DOCUMENTS 7,505,921 B1 * 3/2009 Lukas ............... G06Q 30/0603
705/26.5
9,110,984 B1 * 8/2015 Lewis .................. G06F 16/355
(Continued)

FOREIGN PATENT DOCUMENTS

EP 1 253 536 A1 * 10/2002
WO WO00/77690 A1 * 12/2000
WO WO2007/149216 A2 * 12/2007

OTHER PUBLICATIONS

DeepaYogish et al.,"Survey on Trends and Methods of an Intelligent Answering System", 2017 International Conference on Electrical, Electronics, Communication, Computer and Optimization Techniques (ICEECCOT),Dec. 15-16, 2017,pp. 1-8.*
(Continued)

*Primary Examiner* — Srirama Channavajjala
(74) *Attorney, Agent, or Firm* — Duncan Galloway Egan Greenwald PLLC; Kevin T. Duncan

(57) ABSTRACT

The present invention relates to a computer-based system for supporting Product Customer Support Systems by means for parameter-free and fully unsupervised: clustering of a selected set documents (e.g., based on a query from some database) with unknown ontology (e.g., cases from Customer Support System); building a taxonomy for sets of documents with unknown ontology/taxonomy; enabling a semi-supervised tagging/navigation/recommendations for documents and cross-learning using auxiliary sources (e.g., linking other fields/metadata in Customer Support Systems such as Knowledge DataBase).

11 Claims, 30 Drawing Sheets

(51) Int. Cl.
  *G06K 9/62* (2006.01)
  *G06F 16/35* (2019.01)
  *G06F 16/38* (2019.01)
  *G06F 16/33* (2019.01)
  *G06F 16/2458* (2019.01)
  *G06F 16/93* (2019.01)
  *G06F 16/28* (2019.01)
  *G06F 16/2457* (2019.01)
  *G06N 5/02* (2006.01)

(52) U.S. Cl.
  CPC .......... *G06F 16/285* (2019.01); *G06F 16/334* (2019.01); *G06F 16/35* (2019.01); *G06F 16/38* (2019.01); *G06F 16/93* (2019.01); *G06N 5/00* (2013.01); *G06N 5/02* (2013.01)

(58) Field of Classification Search
  CPC ....... G06Q 330/0241; G06Q 330/0603; G06Q 330/016; G06N 5/00; G06N 5/025; G06N 5/04; G06N 5/02; G06N 5/022; G06F 16/22; G06F 16/285; G06F 16/93; G06F 16/9535; G06F 16/9577; G06F 16/247; G06F 16/2471; G06F 16/24578
  See application file for complete search history.

(56) References Cited

U.S. PATENT DOCUMENTS

| | | | | |
|---|---|---|---|---|
| 9,336,496 B2* | 5/2016 | Knight | ............... | G06F 16/40 |
| 10,346,926 B2* | 7/2019 | Eder | ............... | G06Q 10/06311 |
| 10,366,160 B2* | 7/2019 | Castelli | ............... | G06F 40/56 |
| 2002/0046200 A1* | 4/2002 | Floven | ............... | G06F 16/40 |
| | | | | 706/61 |
| 2003/0187672 A1* | 10/2003 | Gibson | ............... | G06Q 30/02 |
| | | | | 709/206 |
| 2004/0024739 A1* | 2/2004 | Copperman | ............... | G06F 16/353 |
| 2007/0094198 A1* | 4/2007 | Loh | ............... | G06N 5/04 |
| | | | | 706/47 |
| 2007/0143398 A1* | 6/2007 | Graham | ............... | G06Q 40/02 |
| | | | | 709/204 |
| 2007/0294127 A1* | 12/2007 | Zivov | ............... | G06Q 30/0201 |
| | | | | 705/7.29 |
| 2008/0114756 A1* | 5/2008 | Konig | ............... | G06N 20/00 |
| 2009/0030856 A1* | 1/2009 | Arena | ............... | G06Q 10/10 |
| | | | | 706/11 |
| 2010/0174691 A1* | 7/2010 | Caldwell | ............... | G06F 16/285 |
| | | | | 707/696 |
| 2013/0036062 A1* | 2/2013 | Natarajan | ............... | G06Q 10/00 |
| | | | | 705/304 |
| 2013/0282594 A1* | 10/2013 | Gaedcke | ............... | G06Q 30/0241 |
| | | | | 705/304 |
| 2013/0325726 A1* | 12/2013 | Tuchman | ............... | G06Q 30/016 |
| | | | | 705/304 |
| 2014/0081953 A1* | 3/2014 | Ingram | ............... | G06Q 10/10 |
| | | | | 707/722 |
| 2014/0310265 A1* | 10/2014 | Fan | ............... | G06F 16/22 |
| | | | | 707/722 |
| 2014/0337306 A1* | 11/2014 | Gramatica | ............... | G06F 16/2471 |
| | | | | 707/706 |
| 2015/0169544 A1* | 6/2015 | Bufe, III | ............... | G06N 5/02 |
| | | | | 704/9 |
| 2015/0356142 A1* | 12/2015 | Proux | ............... | G06F 16/334 |
| | | | | 706/11 |
| 2016/0180437 A1* | 6/2016 | Boston | ............... | G06F 40/30 |
| | | | | 705/26.7 |
| 2017/0060366 A1* | 3/2017 | Alexander | ............... | G06Q 30/016 |
| 2018/0323984 A1* | 11/2018 | Paul | ............... | H04L 67/26 |

OTHER PUBLICATIONS

Khaled M. Hammouda et al., "Efficient Phrase-Based Document Indexing for Web Document Clustering", IEEE Transactions on Knowledge and Data Engineering, vol. 16, No. 10, Oct. 2004, pp. 1279-1296.*

* cited by examiner

CLUSTERING AND TAGGING ENGINE FOR USE IN PRODUCT SUPPORT SYSTEMS

CROSS REFERENCE TO RELATED APPLICATION

The present application claims benefit of priority to provisional application, with Application No. 62/616,530 filed Jan. 12, 2018, entitled METHOD FOR DOCUMENT CLUSTERING, AUTOMATIC TAGGING & RECOMMENDATIONS, the entirety of which is hereby incorporated herein by reference.

FIELD OF THE INVENTION

This invention generally relates to the field of mining and intelligent processing of data collected from content sources. More specifically, this invention relates to systems for providing product support including customer support and product management.

BACKGROUND OF THE INVENTION

Organizations operate under increasing pressure by customers to quickly and effectively respond to product complaints and inquiries. With connectivity and content becoming increasingly ubiquitous customers expect rapid response and resolution to operational concerns over product or service mal- of dis-function. With ready access to information over the Internet, consumers expect providers and manufacturers to provide content and effective responsive recommendations to inquiries over product or service problems. Human intermediaries often are not available or take too long to work through the problem intake, resolution and recommendation manually. What is needed is a technical solution the effectively and efficiently processes content and data and generates and maintains customer or product support services.

In many areas and industries, including financial services sector, for example, there are content and enhanced experience providers, such as The Thomson Reuters Corporation, Wall Street Journal, Dow Jones News Service, Bloomberg, Financial News, Financial Times, News Corporation, Zawya, and New York Times. Such providers identify, collect, analyze and process key data (content and documents) for use in generating, and managing delivery of content, services and data/content to product/service/content managers and their customers (consumers of such products, content and services). For some providers content, search function, content/data analysis and related delivery systems are the product.

In other applications, products may be traditional "hard" physical products such as automobiles, appliances, consumer electronic devices, etc. Such "hard" physical products may also include processor-based and software-based components and features that may be more essential to the operation and may require higher levels of operational maintenance and customer support. For example, a malfunctioning "motherboard" or operative code is no less a problem and source of customer angst and inquiry than a malfunctioning door or compressor or motor. Intended setup and control features are normally designed to allow the customer to properly operate the product at issue. However, in the event of faulty operation, corrective action cannot be handled manually by the average consumer—in fact with the increased use of so-called "smart" machines consumers are not able to fix such problems and are increasingly less capable of fixing processor/code issues than they are of replacing an electro-mechanical or mechanical component, e.g., a motor, door hinge or door latch. Those who have encountered such problems will readily appreciate that such technical and functional features provide significantly more than a mere abstract concept of operation easily accomplished by a human using pencil and paper.

Some providers use computer and database systems in support of product design, development, manufacture, ordering, inventory, and delivery and service of such products. Such systems and generate and maintain documents about such products and services for use and consumption by professionals and others involved in the respective industries, e.g., product managers, product design teams, service professionals.

The proliferation of documents in electronic form has resulted in a need for tools that facilitate organization of an ever-increasing expanse of documents. One such tool is information extraction (IE) software that, typically, analyzes electronic documents written in a natural language and populates a database with information extracted from such documents. Applied against a given textual document, the process of information extraction is used to identify entities or subjects or topics of predefined types appearing within the text and then to list them (e.g., products, people, companies, geographical locations, currencies, units of time, etc.). IE may also be applied to extract other words or terms or strings of words or phrases.

Companies, such as Thomson Reuters generate, collect and store a vast spectrum of documents. These companies provide users with electronic access to a system of databases and research tools. Professional services providers also provide enhanced services through various techniques to augment content of documents and to streamline searching and more efficiently deliver content of interest to users. For example, Thomson Reuters provides services that structure documents by tagging them with metadata for use in internal processes and for delivery to users.

"Term" as used herein refers to single words or strings of highly-related or linked words or noun phrases or other word segments. "Term extraction" (also term recognition or term mining) is a type of IE process used to identify or find and extract relevant terms from a given document, and therefore have some relevance, to the content of the document.

There are a variety of methods available for automatic event or entity extraction, including linguistic or semantic processors to identify, based on known terms or applied syntax, likely noun phrases. Filtering may be applied to discern true events or entities from unlikely events or entities. The output of the IE process is a list of events or entities of each type and may include pointers to all occurrences or locations of each event and/or entity in the text from which the terms were extracted. The IE process may or may not rank the events/entities, process to determine which events/entities are more "central" or "relevant" to the text or document, compare terms against a collection of documents or "corpus" to further determine relevancy of the term to the document.

Often documents and files are generated in simple form as unstructured documents. Tagging of data is used to enhance files (unstructured files or to further enhance structured files) and data structures may be created to link data and documents containing data with resources to provide enhanced services. For example, Thomson Reuters' Text Metadata Services group ("TMS") is one exemplary IE-based solution provider offering text analytics software used to "tag," or categorize, unstructured information and to extract facts about people, organizations, places or other details from documents. TMS's Calais is a web service that includes the ability to extract entities such as company, person or industry terms along with some basic facts and events. OpenCalais is an open source community tool to foster development around the Calais web service. APIs (Application Programming Interfaces) are provided around an open rule development platform to foster development of extraction modules. Other providers include Autonomy Corp., Nstein and Inxight. Examples of Information Extraction software in addition to OpenCalais include: AlchemyAPI; CRF++; LingPipe; TermExtractor; TermFinder; and TextRunner. IE may be a separate process or a component or part of a larger process or application, such as business intelligence software. For instance, IBM has a business intelligence solution, Intelligent Miner For Text, that includes an information extraction function which extracts terms from unstructured text. Additional functional features include clustering, summarization, and categorization. These functions analyze, for example, accessible data, e.g., stored in traditional files, relational databases, flat files, and data warehouses or marts. Additional functions may include statistical analysis and mining techniques such as factor analysis, linear regression, principal component analysis, univariate curve fitting, univariate statistics, bivariate statistics, and logistic regression.

Advances in technology, including database mining and management, search engines, linguistic recognition and modeling, provide increasingly sophisticated approaches to searching and processing vast amounts of data and documents that relate to all aspects of product design, development and delivery.

SUMMARY OF THE INVENTION

The present invention provides technical solutions for use in solving the afore-mentioned problems and those mentioned below that are prevalent in the area of product development and customer support. The following provides a summary of the present invention, which is described in more detail below and in the attached figures representing exemplary embodiments. The invention is not limited to the particular configurations of the exemplary embodiments.

The present invention provides means for parameter-free and fully unsupervised: clustering of a selected set documents (e.g., based on a query from some database) with unknown ontology (e.g., cases from Customer Support System); building a taxonomy for sets of documents with unknown ontology/taxonomy; enabling a semi-supervised tagging/navigation/recommendations for documents and cross-learning using auxiliary sources (e.g., linking other fields/metadata in Customer Support Systems such as Knowledge DataBase).

Many problems confront manufacturers, retailers and customers that result in inefficiencies, added costs, reputational damage, and less than optimal product satisfaction and customer experience. One key problem is the inherent delay between complaint input and solution/resolution confronting a customer with a faulty product or perceived functional defect. This leads to diminished customer experience and satisfaction and, ultimately, to a reduced customer loyalty. Additional problems are disconnects between product development/design function, service function, and customer support function. Manufacturers provide chat, messaging, emails, telephone and other support to customers, but often these support staff become overworked and busy leading to delays in addressing customer requests. Providing more staff increases costs while having too few support staff leads to unwanted delays. Also, if the product design and development functions do not have effective access to reported product problems and identified solutions, then there is delay in incorporating product design changes into existing designs and manufacturing processes and into new product designs. The present invention addresses these problems and provides solutions by creating and/or maintaining a Product/service Knowledge Database ("PKD") as a product and service resource for manufacturers, service providers, and customers. The present invention clusters one or more of documents, problem metadata, solution metadata, recommendation data, tagging and classification data, and other information, and over time maintains such clusters including be making additional associations or disassociations, in connection with a product/service knowledge database.

In one implementation of the inventions described herein, a customer support system is provided to assist clients (customers) and agents to intake, identify, diagnose problems and recommend solutions or other actions in response to identified problems. For example, a product may be a physical object, e.g., a computer or an appliance such as a refrigerator, or a service, e.g., a professional service resource, such as Thomson Reuters Tax and Accounting services or Westlaw legal services platforms, or a computer/software-based product, e.g., a personal computing device or related operating system or application, e.g., Microsoft Windows or MS Office Suite. For example, a refrigerator manufacture/seller may use a CRM/ERP or similar resource in its operations and may include design, order, warranty, accounting, service and other functions. As part of such operation the PKD may serve as a repository of "documents" related to various products, including the refrigerator, such as service or trouble-shooting solutions and processes. Product operating, installation and owner manuals may also be included in the PKD. The PKD may operate with a Graphical User Interface ("GUI")-based online Product Customer Support System or Resource ("PCSS") for problem intake, assistance, service request, and resolution. The PCSS may include an agent-side or facing set of functions and a client or user-side set of functions, including a set of user interfaces and associated chat functions, trouble-shooting functions and others. The invention provides a discovery engine as a tool to explore an arbitrary set of documents (which could be obtained as a result of a search over PCSS with parameters/fields of interest), build its taxonomy and simplify navigation/search and provide recommendations. Those interested in the present invention and the solutions it offers include: product managers (provides full access to documents taxonomy and recommendations); customer support services including agents working with customers to resolve problems (e.g., help customer support agents efficiently classify customer problems and find solutions for customer problems, partial access to documents taxonomy and recommendations); and customers (provides self-service: access only to recommendations). Permissions and accounts may be used to differentiate among users of the system and to limit or direct access based on such permissions.

The PCSS and PKD may be integrated and presented as a combined facility or they may be functionally separated while integrated via communications network. Functions may be shared and/or divided among the PCSS and PKD. "PCSS/PKD" is used to refer to both systems whether combined in one facility or separate and functionally integrated or connected. The PCSS and/or PKD may be separate from a CRM/ERP system or may be integrated with or otherwise interconnect with such resources to help obtain and update product related information. Documents stored may be tagged and may be organized using a taxonomy or classification system. The documents may be organized to facilitate a hosted, agent-driven resource or an automated resource to assist customers and others in addressing customer needs, e.g., service inquiries.

In a further manner of implementation, the present invention may provide automated tagging function to automatically tag and/or cluster documents stored in the PCSS/PKD for recall in providing automated customer support. For example, in the event there is an existing knowledge database having data related to a set of products, the present invention may use features and similarities based on tagged information or semi-supervised processes to generate a set of documents for use in a customer support for a new product. For instance, a PCSS/PKD for a new product that is a new version or update of an existing product may be built using the PCSS/PKD of the existing product. Problems and solutions associated with design features common to the existing and new products may be clustered and tagged for use in recommendations associated with the new product. By clustering problems and solutions at the functional feature level, e.g., an ice-maker that is common to multiple models of refrigerators and freezers, then a new product having the same functional feature, e.g., ice-maker, will have a set of recommendations automatically generated in the PCSS/PKD for use in responding to received user inquiries or problems reported for that new product related to the common feature. The PCSS/PKD can then automatically update the clustered problems/solution/feature with information related to service/support inquiries and resolutions related to the new product thereby enriching the set of problems and recommendations for use with all products associated with the clustered problems/solution set. In addition, over time as problems/solutions become less relevant to the cluster the PCSS/PKD may automatically disassociate documents to refine and update the cluster and improve the efficiency of the customer support resource.

In another implementation or a complimentary implementation, the invention may be used in supporting product managers and development teams identify and address or correct or improve product design and operation. One existing problem is a disconnect between product design, manufacture and service functions. Delays in identifying problems with a product and implementing solutions into the design and manufacture of subsequent products decreases customer experience, increases warranty and service related costs of a product, and diminishes product and manufacturer reputation. For example, sets of known solutions (Known Solution Records—KSR) and sets of historical data records (Historical Data Records—HDR) combined provide a Product Knowledge Database collection of records. In operation, queries are presented and sets of HDR and/or KSR records are generated (e.g., based on similarity of records to query terms entered by an agent) for use by the agent in resolving customer product problems. Customer complaints may result in service tickets and are referred to herein as "cases" and include, for example, a description of a problem, questions an agent may ask the customer to capture information about the reported problem, product information, and resolution or suggested or recommended solutions to the reported problem. Each case may result in a record and ultimately an HDR. A second level of support may also be provided wherein an "expert" or higher level representative may be called in to assist an agent in resolving a customer problem. These further "cases" may be added to the Historical Data Records database for future reference. For example, product managers may from time to time examiner historical data records for determining qualitative problems associated with products for which they are responsible and use the information to implement design or operation changes to address widespread issues with products. In addition, links to HDRs with KSRs may be formed and weighted to refine the system as a form of feedback to enhance query results for agent services. Accordingly, the knowledge database associated with a product may be used to capture reported complaints and problems associated with a product. For example, a product manager or team involved in the life cycle of a refrigerator product may receive complaint or trouble-shooting data received from customers associated with real or perceived problems with the operation of purchased refrigerators and assist in resolving the operational defect or problem and then incorporate such solutions in the product design, subsequent revisions or versions or models, and in subsequent manufactured products to avoid similar customer complaints and undesired performance issues. In this manner the invention serves to enhance the customer experience, improve quality and reputation of the product and manufacturer, reduce cost of warranty or trouble-shooting products, among other benefits.

Advantages provided by the present invention include one or more of: an unsupervised method to build taxonomy for a set of documents with unknown ontology, that method comprising of: a sequentially applied parameter-free unsupervised hierarchical clustering (e.g., with adaptive edges pruning of a relevant graph network describing relations between documents; with adaptive feature selection at each hierarchical level); a parameter-free unsupervised method to derive taxonomy brunches as a by-product of the clustering above; allocating components of derived taxonomy branches to relevant hierarchy levels; complimented with semi-supervised cross-domain learning and recommendations comprising of: provide recommendations based on derived clustering and taxonomy; unsupervised method to build taxonomy for a set of documents with unknown ontology and use it for a search, cross-domain learning and recommendations.

The present invention may be incorporated into an Enterprise Content Platform (ECP) that combines aspects of product design, development, service and customer support information in a product knowledge database. For example, the PCSS of the present invention may be integrated into Enterprise-level Discovery Engine for Customer Support System. This organized data in such a system may include data or tagged metadata related to content extracted from documents or previously clustered around a concept, product, product feature, product reported problem, or other relevant information.

There are known services providing preprocessing of data, entity extraction, entity linking, indexing of data, and for indexing ontologies that may be used in delivery of peer identification services. For example U.S. Pat. No. 7,333,966, entitled SYSTEMS, METHODS, AND SOFTWARE FOR HYPERLINKING NAMES, U.S. Pat. Pub. 2009/0198678, entitled SYSTEMS, METHODS, AND SOFTWARE FOR ENTITY RELATIONSHIP RESOLUTION, U.S. patent application Ser. No. 12/553,013, entitled SYSTEMS, METHODS, AND SOFTWARE FOR QUESTION-BASED SENTIMENT ANALYSIS AND SUMMARIZATION, filed Sep. 2, 2009, U.S. Pat. Pub. 2009/0327115, entitled FINANCIAL EVENT AND RELATIONSHIP EXTRACTION, and U.S. Pat. Pub. 2009/0222395, entitled ENTITY, EVENT, AND RELATIONSHIP EXTRACTION, the contents of each of which are incorporated herein by reference herein in their entirety, describe systems, methods and software for the preprocessing of data, entity extraction, entity linking, indexing of data, and for indexing ontologies in addition to linguistic and other techniques for mining or extracting information from documents and sources.

Additionally, systems and methods exist for identifying entity peers including U.S. patent application Ser. No. 14/726,561, (Nefedov et al.) entitled METHOD AND SYSTEM FOR PEER DETECTION, filed May 31, 2015, now issued as US Pat. No. 10,019,442 issued Jul. 10, 2018, which is hereby incorporated by reference in its entirety.

In a first embodiment the present invention provides a computer-based Product/Service Customer Support System ("PCSS") in communication over one or more communications networks with a plurality of remote customer-operated devices to provide a product/service resource, the PCSS comprising: a Product/Service Knowledge Database ("PKD") comprising a set of known solution records and a set of historical data records, the set of known solution records being related to one or more products/services and comprising product/service resolution data, and the set of historical data records being related to one or more products/services and comprising product/service inquiry data; a server system adapted to communicate with the PKD and with remote customer-operated devices and comprising a set of processors, and a set of memory components adapted to store code executable by the set of processors; a customer/agent user interface adapted to receive inputs from users and to present users with agent-generated prompts, the inputs and prompts related to a product/service inquiry; a tagging engine adapted to identify, extract and tag data from the inputs and/or prompts and generate a set of tagged inquiry data; a clustering engine adapted to perform unsupervised hierarchical clustering at a plurality of hierarchical levels in one or more of the following domains: documents-similarity domain; features domain (features co-occurrence); and joint clustering, the clustering engine further adapted to generate a set of clusters based on comparing the tagged inquiry data with one or more of known solution records, historical data records, and/or clusters of known solution records and/or historical data records; a recommendation engine adapted to generate for output a set of documents including recommendations responsive to the problem/service inquiry.

The system may further comprise and be further characterized in one or more of the following manners: The clustering engine may be adapted to connect one or more of documents, product data or metadata, problem data or metadata, solution data or metadata, recommendation data or metadata, tagging and classification data, and other product/service related information into a cluster network. The clustering engine may be further adapted to process an additional set of documents to make additional associations or disassociations for storing in the PKD, and wherein at least some of the additional set of documents are stored in the PKD as historical data records and available for use in clustering by the clustering engine. The customer/agent user interface may include one or more applications executed centrally and/or remotely via user devices or computing machines and includes an input interface for presenting to a user operating a remote device, and user interface elements related to data elements or fields or database targets. The PCSS may further comprise a discovery engine adapted to extract and tag keyword data to allow analyst-type users to classify and navigate over historical data records and/or known solution records to quickly identify trends related to user inquiries, and adapted to provide cross-mapping or/and cross-learning using mapping extracted taxonomies from different topical domains associated with historical data records and/or known solution records. The tagging engine may tag inquiry data based on a set of topics, and the clustering engine may be adapted to cluster cases based at least in part on topics to generate a set of clusters adapted for use by product manager-type users to identify trends or product/service related issues over time. The recommendation engine may output the set of documents including recommendations responsive to the problem/service inquiry to 1) an agent for selecting from the set of documents a suggested recommendation as resolution of a problem associated with the problem/service inquiry, or 2) directly to a remote customer-operated device. The customer/agent user interface may be adapted to receive product/service related queries as user inputs, to present to users agent-generated questions related to the received queries as prompts for further information, and to receive user responses to the agent-generated questions, and wherein the tagged inquiry data includes tagged data derived from the agent-generated questions and/or the received user responses. The PKD may receive and store the tagged inquiry data and generate a new historical data record including topics comprised of one or more of: customer inquiry data, agent question data, user response data, product data, resolution data, and recommendation data. The clustering engine and/or the tagging engine may be adapted to perform similarity and feature scoring to determine if the tagged inquiry data is closely associated with an existing record or document or cluster of records or cluster of documents stored in the PKD. The PCSS may further comprise an adaptive network pruning module adapted to amplify clustering based on adaptive thresholding. The PCSS may further comprise a taxonomy build module adapted to provide: 1) taxonomy extraction based on one or both of documents-similarity domain and/or features domain; or 2) taxonomy extraction based on feature engineering including taxonomy extraction using distinct features and/or taxonomy branch reconstruction using ranked list of features; or 3) taxonomy extraction based on feature engineering including IDF. The customer/agent user interface may include elements adapted to present a set of suggested recommendations from which the user may select or confirm as being relevant and responsive to the user inquiry and/or elements for the user to select/deselect to indicate one or more of the set of suggested recommendations that are not responsive to the user query. The tagging engine may be adapted to use natural language processing techniques to identify, extract and tag data from the inputs and/or prompts and generate the set of tagged inquiry data. The tagging engine may be adapted to use term frequency (tf), inverse term frequency (idf), and/or tf-idf functions to identify, extract and tag data from the inputs and/or prompts and generate the set of tagged inquiry data. The PKD may be integrated with or interconnected with a CRM/ERP system. The PKD may include an existing knowledge database having data related to an existing first set of products, and the PCSS may be adapted to use features and similarities based on tagged information and/known solutions to generate a set of known solution records for use with a new product not included in the existing first set of products. The PCSS may further comprise wherein clusters of known solution records may be formed for use with a new product having common design features to an existing product for use in recommendations associated with the new product.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

Figure 1:
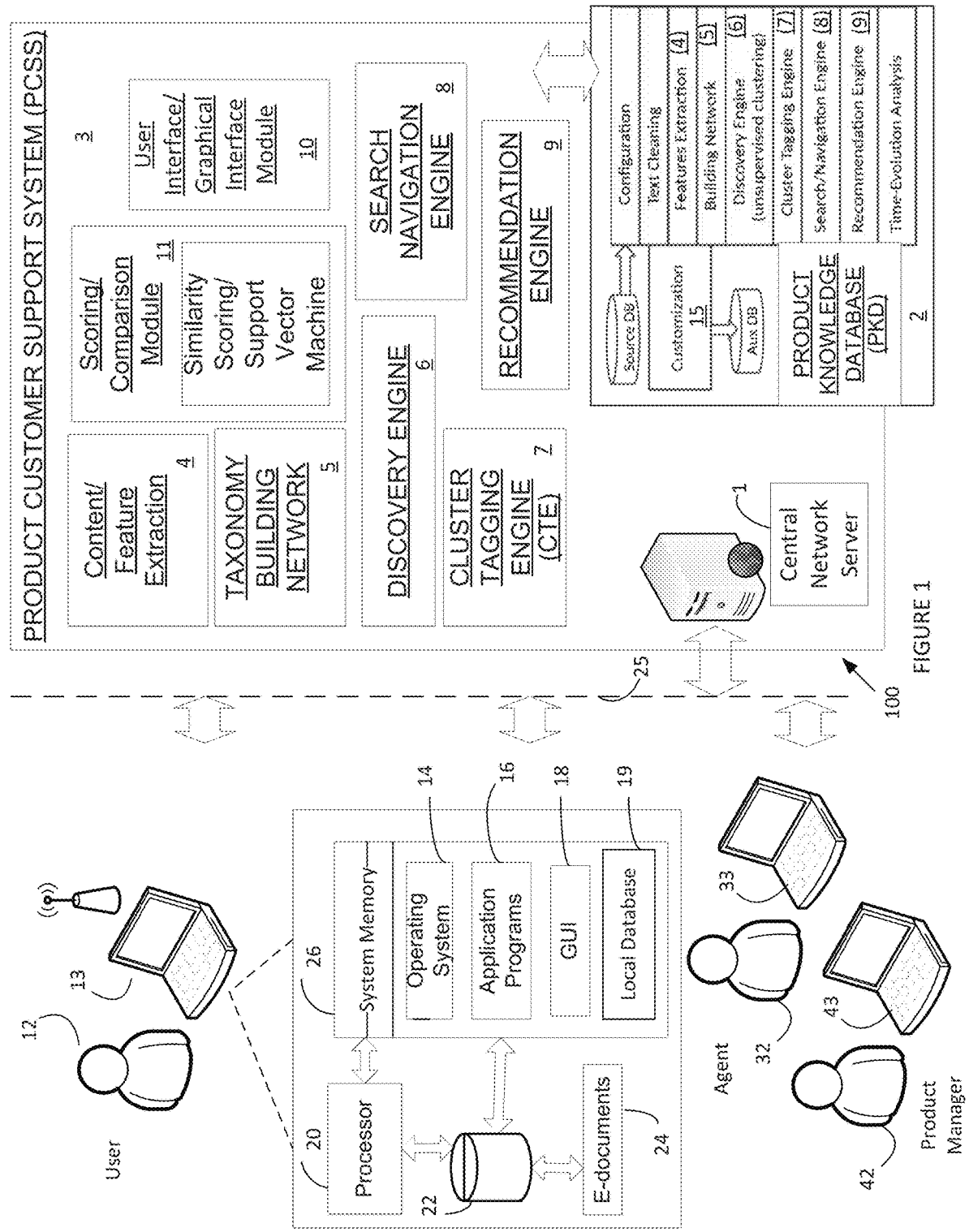
FIG. 1 is a schematic diagram illustrating a computer-based system having clustering and tagging engines for use in product support systems in accordance with a first embodiment of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

The present invention provides a Product/Service Knowledge Database ("PKD") as a product and service resource for manufacturers, service providers, and customers. The PKD is disclosed herein in exemplary embodiments but one possessing ordinary skill in the art would understand the invention provides solutions that may be implemented in a variety of forms and is not limited to the implementation disclosed herein for purposes of explaining the invention. For instance, one embodiment of a system using the present invention is in a client/server environment wherein a central server operating in connection with a Product/Service Customer Support System (PCSS), which may be integrated with or in the form of a Professional Services Resource System ("PSRS"). The PCSS includes a central server and is computer-based and includes processors, memory components that store executable code sets for processing by the processors, and a database or mechanisms to access one or more databases, including the PKD. The central server communicates over one or more connected communications networks with a plurality of remote client devices. In one manner of operating the PCSS, the central server includes a customer/agent user interface, a clustering engine, a tagging engine and a data extraction module. As used herein the term "product/service" refers to either a product or a service as appropriate for the use, i.e., if the PCSS is for providing customer service in connection with products (and problems encountered/reported or inquiries about such products) then the product/service refers to a product and if the PCSS is for providing customer service in connection with services (and problems encountered/reported or inquiries about such services) product/service refers to a service. Also, as used herein "document" refers to an electronic file, record, case, article or other form of grouped information or data.

The clustering engine is adapted to cluster one or more of documents, containing a number of metadata fields, such as a product related metadata (Product Name, Product Version, Product Configuration, Access Rights), a problem description metadata fields (e.g., Subject, Description), solution metadata fields (Symptoms, Diagnosis), recommendation data (Problem Resolution, Relevant Problems), tagging and classification data, and other information, and over time maintains such clusters including making additional associations or disassociations, in connection with a product/service knowledge database. The customer (client)/agent (server) user interface may include one or more applications executed centrally and remotely via user devices or computing machines and includes an input interface for presenting to a user operating a client device, user interface elements related to data elements or fields or database targets.

The user may input product/service related inquiries or queries (user input) via the input interface. The user input is communicated via the communications network to the agent (server), which receives the user input. The PCSS may store the user input and compare the user input against a set of documents or records stored in the database. Similarity and feature scoring and other comparing and matching processes are performed to determine if the user input is closely associated with an existing record or document or cluster of records or cluster of documents. If the user input does not match an existing PCSS cluster then the PCSS may attempt to match the user input with a set of un-clustered records or documents to determine a match for purposes of responding to the user inquiry or query. The PCSS may tag certain portions or words input via the user input as part of the comparing and scoring and matching process. If the PCSS determines the user input is closely associated with a cluster of documents then the PCSS may generate a response to the user input that is communicated to the user via the communication network and user interface.

The output or response may include a set of documents including recommendations responsive to a problem or need identified in the user inquiry/input. The response may alternatively or additionally include a set of suggested recommendations from which the user may select or confirm as being relevant and responsive to the user inquiry. The user interface may also include elements for the user to select/deselect to indicate one or more of the set of suggested recommendations that are not responsive to the user inquiry. The further user inputs may be communicated to the central agent (server) via the communications network and be received as feedback to the PCSS. The PCSS may use the confirming and/or rejection information to help refine the clustering and scoring processes. In this manner the PCSS automatically learns what user input data is confirmed as relevant to stored recommendations. The PCSS may store user inputs as tagged data to use in its processes of refining clusters. In this manner over time the PCSS may associate with clusters tagged user input data and recommendation data and documents and may likewise over time disassociate user input data and/or recommendation data and documents.

The PCSS may use natural language processing techniques, for example term frequency (tf), inverse term frequency (idf), tf-idf, part-of-speech tagging and others to identify, extract and/or tag data received via user input or by other content delivery functions. The PCSS may also use its processes on a large corpus of documents to build a taxonomy and/or classification. In addition, the PCSS may employ matrixes or tables or other structures in identifying and scoring similarities and in clustering data and documents in the cluster engine. Ultimately the PCSS may arrive at a set of clusters as a master customer service system to use in processing user inputs and generating sets of recommendations.

In this exemplary implementation the invention provides a customer support system to assist clients (customers) and agents to intake, identify, diagnose problems and recommend solutions or other actions in response to identified problems. For example, a product may be a physical object, e.g., a computer or an appliance such as a refrigerator, or a service, e.g., a professional service resource, such as Thomson Reuters Tax and Accounting services, Eikon financial services or Westlaw legal services platforms, or a computer/software-based product, e.g., a personal computing device or related operating system or application, e.g., Microsoft Windows or MS Office Suite. In one application, for example, a refrigerator manufacture/seller may use a CRM/ERP or similar resource in its operations and may include design, order, warranty, accounting, service and other functions. As part of such operation the PCSS may serve as a repository of "documents" related to various products, including the refrigerator, such as service or trouble-shooting solutions and processes. Product operating, installation and owner manuals may also be included in the PCSS. The PCSS may include a Graphical User Interface ("GUI")-based online Customer Support Resource ("CSR") for problem intake, assistance, service request, and resolution. The CSR may include an agent-side or facing set of functions and a client or user-side set of functions, including a set of user interfaces and associated chat functions, trouble-shooting functions and others.

The PCSS and PKD may be separate from a CRM/ERP system or may be integrated with or otherwise interconnected or interoperable with such resources to help obtain and update product related information. Documents stored in the product may be tagged and may be organized using a taxonomy or classification system. The documents may be organized to facilitate a hosted, agent-driven resource or an automated resource to assist customers and others in addressing customer needs, e.g., service inquiries.

In a further manner of implementation, the present invention may provide automated tagging function to automatically tag and/or cluster documents stored in the PCSS/PKD for recall in providing automated customer support. In this example, as opposed to having a live person staffing a chat, call center, or other function the PCSS/PKD may be a fully automated service. It is understood that for those situations in which the automated customer service system fails to fully satisfy a customer request the customer may also be provided with a way to reach out to a supervised or agent-assisted function.

Also, in another manner of implementation, in the event there is an existing knowledge database having data related to a set of products, the present invention may use features and similarities based on tagged information or semi-supervised processes to generate a set of documents for use in a customer support for a new product. For instance, a PCSS/PKD for a new product that is a new version or update of an existing product may be built using the PCSS/PKD of the existing product. Problems and solutions associated with design features common to the existing and new products may be clustered and tagged for use in recommendations associated with the new product. By clustering problems and solutions at the functional feature level, e.g., an ice-maker that is common to multiple models of refrigerators and freezers, then a new product having the same functional feature, e.g., ice-maker, will have a set of recommendations automatically generated in the PCSS/PKD for use in responding to received user inquiries or problems reported for that new product related to the common feature. The PCSS/PKD can then automatically update the clustered problems/solution/feature with information related to service/support inquiries and resolutions related to the new product thereby enriching the set of problems and recommendations for use with all products associated with the clustered problems/solution set. In addition, over time as problems/solutions become less relevant to the cluster the PCSS/PKD may automatically disassociate documents to refine and update the cluster and improve the efficiency of the customer support resource. In this manner the PCSS/PKD establishes, updates and maintains navigational paths that may be used in either a fully automated customer service system or in an agent-assisted system. The navigational paths provided by the clusters are stepped through by user inputs or may be stepped through by an agent after presenting recommended responses to a user and receiving user feedback or confirmation.

In another implementation or a complimentary implementation, the invention may be used in supporting product managers and development teams identify and address or correct or improve product design and operation. One existing problem is a disconnect between product design, manufacture and service functions. Delays in identifying problems with a product and implementing solutions into the design and manufacture of subsequent products decreases customer experience, increases warranty and service related costs of a product, and diminishes product and manufacturer reputation. For example, a knowledge database associated with a product may be used to capture reported complaints and problems associated with a product, e.g., a refrigerator. A product manager or team involved in the life cycle of the refrigerator product may receive complaint or trouble-shooting data received from customers associated with real or perceived problems with the operation of purchased refrigerators. The product design team or product manager may also be permitted to alter the set of recommendations based on feedback and review of customer service records. In this manner the PCSS/PKD assists in resolving operational defects or problems and then may be used to incorporate such solutions in the product design, subsequent revisions or versions or models, and in subsequent manufactured products to avoid similar customer complaints and undesired performance issues. In this manner the invention serves to enhance the customer experience, improve quality and reputation of the product and manufacturer, reduce cost of warranty or trouble-shooting products, among other benefits.

As shown in FIG. 1, product/service customer support facility 100 includes a central network server/database 1, product knowledge database (PKD) 2, and product customer support system 3. The product customer support system (PCSS) 3 is connected through the central network server 1 to a plurality of remote computing devices 13 operated by remote users 12 over communications network 25, such as the Internet or a combination of wired and wireless networks. Product customer support system 3 is a computer-based system that employees one or more processing devices, one or more memory components, and associated circuitry and components. Product customer support system model three includes content Feature extraction module 4, taxonomy building network module 5, discovery engine 6, cluster tagging engine CTE 7, search navigation engine 8, recommendation in June 9, user interface interface/graphical interface module 10, and scoring/comparison module 11. Product knowledge database 2 includes one or more source data bases as well as auxiliary databases as customized to pass and receive data and instructions from PCSS 3. Product knowledge database 2 provides database structures for use in containing and handling maintaining and processing data for use in text clearing, feature extraction, taxonomy building network, Discovery Engine, plus or tagging engine, recommendation engine, and time-evolution analysis. The inner operation of the product customer support system with modules and engines and product knowledge database 102 is described in further detail here in below.

PCSS 3 may be used in conjunction with a system offering of a professional services provider, e.g., Thomson Reuters (Tax & Accounting) Inc. ("TRTA"), a part of Thomson Reuters Corporation, and may be enabled using any combination of Internet or (World Wide) WEB-based, desktop-based, or application WEB-enabled components. The PCSS 103 via user interface/graphical interface module 10 communicates with remote connected devices 113 via GUI interface 118 operating on such remote devices 13, such as a PC computer or the like, that may comprise system memory 12, operating system 14, application programs 16, graphical user interface (GUI) 18, processor 20, and storage 22 which may contain electronic information 24 such as electronic documents. Client-side application software may be stored on machine-readable medium and comprising instructions executed, for example, by the processor 20 of computer 13, and presentation of web-based interface screens facilitate the interaction between user system 13 and central system 1/PCSS 3. The operating system 14 should be suitable for use with browser functionality, for example, Microsoft Windows operating systems Mac iOS and other commonly available and widely distributed operating systems. APIs may be used to link and perform various functions related to the PCSS 3. The system may require the remote user or client machines to be compatible with minimum threshold levels of processing capabilities, minimal memory levels and other parameters.

The configuration thus described in this example is one of many and is not limiting as to the invention. Central system 1 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 1 may include self-contained applications within a desktop or server or network environment and may utilize local databases, such as Microsoft Access, SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQL-Server™, Oracle 8I™, 10G™, or some other suitable database application may be used to manage the data. These tables may be organized into an RDS or Object Relational Data Schema (ORDS), as is known in the art.

The present invention provides a system for discovering new trends and clustering cases in Customer Support Systems, PCSS 3, and includes automatic tagging for clusters and a Recommendation Engine to find relevant resolutions. For example, the Discovery Engine 6 and Recommendation Engine 9 may be used in connection with support of platforms such as the Thomson Reuters ONESOURCE platform, and in implementing a system and method for document clustering, automatic tagging and recommendations using analytics for product or customer support systems, such as PCSS 3 described herein. The following description includes uses, architecture, data processing flow, algorithm description, and advantages. In one instance, documents/cases analytics in product customer support system. A Discovery Engine 6 is used to discover dominating problems and/or trends by clustering cases to help product managers locate and fix problems with products. In this example the Discovery Engine 6 is based on unsupervised clustering, but supervised clustering or extending existing clustering are also manners of operation. Automatic tagging for clusters done by the Cluster Tagging Engine 7 ("CTE") helps analysts classify and navigate over cases. In this example the CTE 7 is configured to use features engineering and unsupervised clustering; automatic topic tagging for a set of documents/cases; and creation of new tags for topics documents if the reported problems are not in the knowledge database. In this manner the PCSS 3/PKD 2 provides for automatic taxonomy building for a selected set of documents. The CTE 7 may also be configured to provide cross-content learning and soft clustering as well as semi-supervised learning to use already classified cases from an existing product knowledge database. The PCSS 3/PKD 2 may be configured to enable self-service for customers. For example, the PCSS 3 may be used to find similar cases reported before, such as using Discovery Engine 5 and Search Engine 8. The PCSS 3/PKD 2 may also be configured to recommend a possible solution based on cases resolved before Recommendation Engine 9 soft-clustering.

Algorithm-based processes are used in the PCSS 3/PKD 2. Using a customization block 15, the PCSS 3/PKD 2 is configured by database and configuration settings, semi-supervised learning, and auxiliary data, which includes knowledge base, specific customer/product requirements, customer/product taxonomy/ontology/rules. Cross-content analysis may be used including multiple network layers (e.g., Description, Symptoms, Diagnosis), auxiliary content (e.g., customer specific data, requirements), and cross-layer learning (e.g., based on multiple layers and aux content above).

One advantage of the present invention is providing an adaptive discovery engine for a (selected) set of documents based on: unsupervised (and parameter-free) clustering to find problems/trends, and automatic tags/taxonomy extraction for a selected data/cluster (both in case similarity and features domains, may be used separately or combined). Another advantage of the invention is a system complemented with semi-supervised learning using knowledge base, specific customer/product requirements and customer/product taxonomy/ontology/rules.

Particular features that may be included in the present invention include: feature extractions (e.g., keywords, n-grams, tuples) and cleaning; building a co-occurrence matrix between features; features selection/engineering; calculating pair-wise similarities between documents and then building a weighted network list corresponding to a weighted graph, where nodes denote documents and edges are similarities between documents; apply edges pruning based on the suggested algorithm to amplify clusters and derive graph hierarchical structure; unsupervised (and parameter-free) hierarchical clustering (e.g., based on a random walk) to enable taxonomy extraction; retrieve features for each cluster and apply feature engineering to facilitate taxonomy extraction (e.g., distinct features for each cluster); apply clustering over features co-occurrence matrix to get jointly-connected feature fingerprints; match feature-fingerprints above to clusters in doc-similarity graph; apply joint clustering over doc-similarity graph and features co-occurrence matrix; apply the suggested unsupervised features taxonomy extraction algorithm based on a random walk to build hierarchical clusters for documents; apply second step feature engineering for a co-occurrence matrix to facilitate taxonomy extraction based on distinct features and nested sub-clustering: repeat all steps above for derived clusters at the current hierarchical level (e.g., based on pruning according to thresholds derived from nodes weight distribution). In addition, the system may be configured to combine clustering/taxonomy extraction results with: knowledge database; specific customer/product requirements; and customer/product taxonomy/ontology/rules, including by using semi-supervised learning (e.g., a modified LDA).

In one manner of operation, the Discovery engine 6 is used to extract and tag data to discover new trends and problems in a product by analyzing customer support databases PKD 2 to help product managers to locate and fix problems in such products. The Cluster Tagging Engine 7 automatically tags keywords for clusters to help analysts to classify and navigate over cases, for instance: based on already classified cases from a knowledge database 2 or/and, creation of new tags if the reported problems are not in the knowledge database, and cross-content learning.

The Search Navigation engine 8 and Recommendation engine 9 may be used to provide and enable self-service for customers, e.g., to find similar cases reported before (discovery and search engine), and to recommend possible solutions based on cases resolved before (recommendation engine).

To adjust to specific requirements the PCSS 3 may be complemented by a tuning processing block to allow/incorporate user/application/product specific data into semi-supervised systems on the top of the unsupervised learning.

In one embodiment, the Discovery Engine 6 uses text analytics methods (text cleaning, stemming, feature extraction, features cleaning, TF-IDF, and/or others) to build Feature Matrix T with dimensions Case_Id×Feature_Vector. In addition, a Clean Feature Matrix using standard methods such as SVD, or heuristic methods on dimensionality reduction for a large corpus of documents. The discovery engine 6 may be used to build a sparse similarity matrix M between cases, e.g., based on cosine similarity, M=T*T'. Also, the Discovery Engine 106 may apply dimensionality reduction to similarity matrix M to clean cases with low similarity; Also, a further manner of operation may involve presenting relations among cases as a weighted undirected graph WUG (or a network), where vertices are cases and weights associated with edges are similarities between cases. The PCSS 3 may also apply network analysis tools to cluster the WUG, particularly, unsupervised learning on graphs, allowing clustering and discovery of new problems based on a hierarchical community detection method using modularity maximization over different fields in case description (such as description, subject, resolution, etc.). The PCSS 3 may also extract keywords for each cluster and their scores using a novel method of inverse-IDF transform and remap back UWG vertices and keywords back to Case IDs and apply nested clustering (clustering within clusters) to increase clustering topics resolution.

Search Navigation processes may be based on graph presentation and clustering (a modified Katz similarity with Page Rank). Recommendation Engine 9 may utilize graph presentation and clustering (soft clustering, multi-cluster membership, max likelihood and a modified random walk). The invention may also use a multi-layer graph approach to merge/extract information from different graph layers, for example, using graph layers constructed from different fields, such as Problem Description and Diagnosis and Problem Solution. In addition, PSCC 2/PKD 3 may utilize cross-content or cross-domain learning, described in more detail below in connection with FIGS. 29-31. For instance, features extraction 4, building network 5, discovery engine (unsupervised clustering) 6, and cluster tagging engine 7 may be used to refine the overall process of PSCC 2/PKD 3. In one example, two cases having connections or links in one or more topics or fields, e.g., Description, Symptom, Question, Recommendation, may be considered for added similarity relevance and the emphasis may depend in whole or in part on the particular topics or fields linked.

Product/service customer support facility 100 and PKD 2/PCSS 3 are configured to receive communications from users 12, such as customers who have purchased products, for handling in either an automated fashion or by Agents 32 operating computing devices 33 connected to the facility 100. In addition, Product Managers 42 connect to the facility via computing devices 43 to access the PKD 2 and PCSS 3 functionality for use in monitoring issues related to products. Product managers may mine HDRs for solutions to add or supplement the known solution KSR database. For instance, when users 12 call or chat or otherwise access PCSS 3 for interaction with an agent 32, the agent receives information, formulates questions to ask users 12 to gain more information and initiate a service ticket or case number which ultimately becomes a record stored in the PKD 2, e.g., becomes an Historical Data Record. The case number record is accessible by product managers 42, e.g., PCSS 3 may generate communications or reports that are used by product managers to monitor product issues and resolutions. This information may be used to arrive at product modifications, recommended resolution modifications or a number of other useful purposes. This is described in more detail below.

Figure 2:
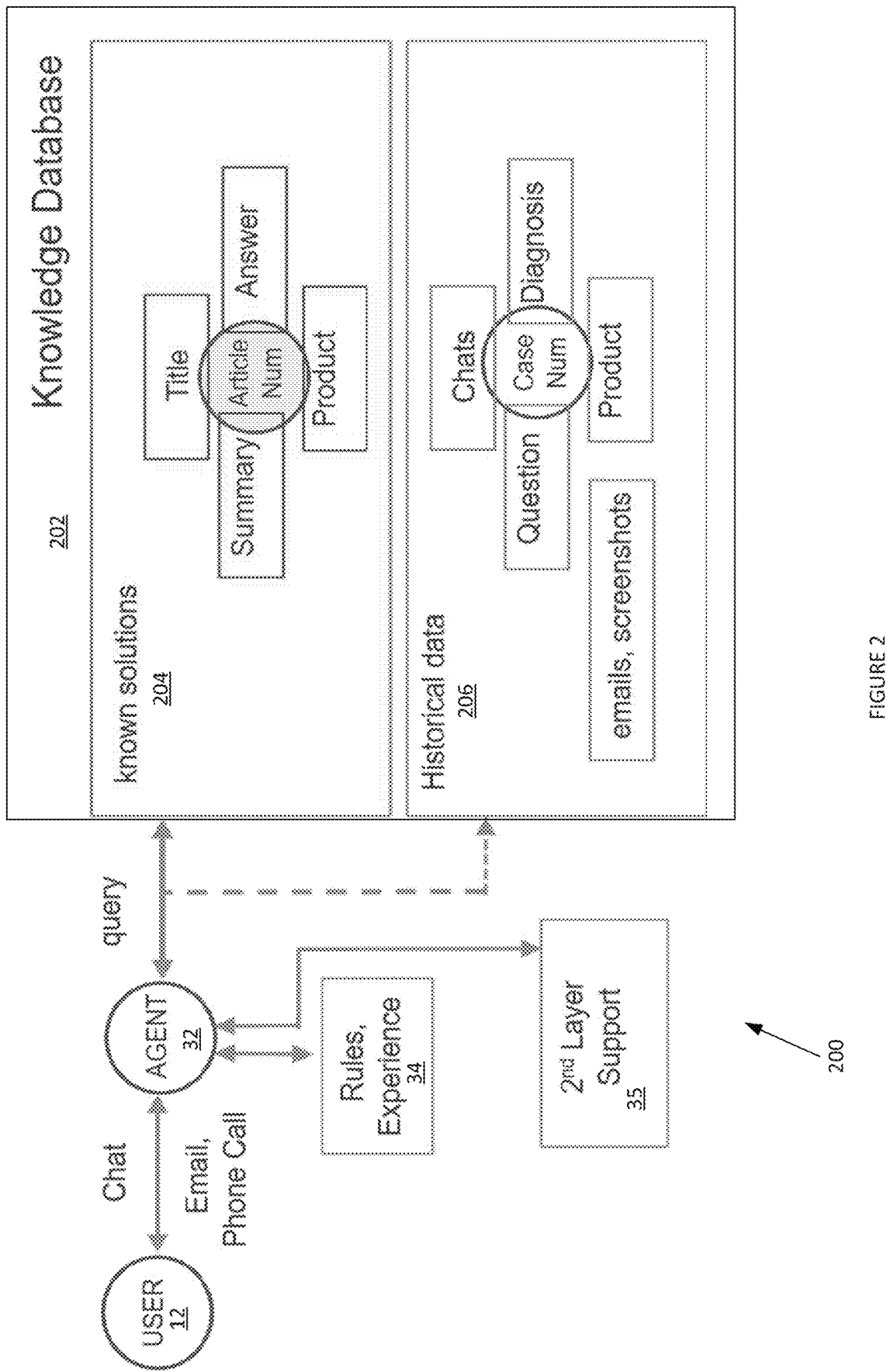
FIG. 2 is a schematic diagram illustrating an exemplary information flow between a user/customer, an agent and a Knowledge Database associated with the embodiment of FIG. 1.

The PCSS 3/PKD 2 provides flexible, multi-faceted interfaces for several critical operational functions represented by three key Personas: 1) Product Manager: exploration: looking for common problems across all products by making queries over PKD (HDB and KDB); 2) PCSS agent: looking for a solution first over KDB and then in HDB. If not found, then forward the case to the 2nd layer support persons who have more expertise. FIG. 2 shows a typical PCSS agent workflow; and 3) User/customer in both an agent-assisted manner and in an automated self-service manner with a limited query to the PCSS 3/PKD 2 to find a solution to a problem encountered with a product or service.

The PCSS 3/PKD 2 is used to address several critical applications and uses, namely, 1) Product manager case who makes data exploration and tries to understand problems using clustering cases and getting insights (via taxonomy extraction); 2) it helps to automatically build/extend/enrich PDK 2 (avoid/minimize human data curation), and 3) it may be used in self-services to provide customers recommendations/solutions. In addition, the PCSS 3/PKD 2 may be widely used in other fields which require exploration of an arbitrary set of documents (based on a query) by using unsupervised clustering and relevant taxonomy extraction.

Now referring to FIG. 2, an exemplary service call scenario 200 is illustrated in which a customer/user 12 initiates a chat, email, phone call or other means of communicating a problem or request for assistance related to a product. An agent 32 is assigned to respond to the communication to assist the customer in inquiry resolution. A description of the problem is collected at intake and the agent may ask the user additional questions to further expand on the issue. The questions may be presented by the PCSS 3/PKD 2 to the agent or may be generated based on the agent's experience and knowledge. The agent 32 formulates a query which is then submitted to an input of the PCSS 3/PKD 2. In this example, the PCSS 3/PKD 2 comprises a Knowledge Database 202 comprised of a set of Known Solution Records (KSR) 204 and a set of Historical Data Records (HDR) 206. In implementation, KSRs will be significantly fewer in number when compared with the number of HDRs, e.g., 10,000 KSRs versus millions of HDR records. Each KSR may include one or more fields including Title, Summary, Answer, Product, Solution, Recommendation and each HDR may include one or more fields including Chats, Question, Diagnosis and Product and may be linked to associated emails, screenshots and other items used in handling user inquiries. Historical data records or database (HDR) (used herein as "cases" or "case numbers") contains all cases, where each case has a number of fields: (e.g., from user: user profile, Product, Version, Question, Problem Description; from PCSS agent: Case number, Symptoms, Diagnosis, Resolution, Recommendations). Known Solution Records or database (KSR) are cases with similar problems that are manually grouped by experts, then experts define a common solution (named here as "Article") for the selected group of cases. In other words, Knowledge Database 202 ("KDB") is a collection of typical solutions (Articles) with similar cases attached. The query is shown with a hashed line connecting to the HDR 206 as in one manner of operation if the PCSS 3 determines that a KSR record is sufficient to address the received query then HDR 206 may not be included in a responsive list of documents presented to the agent (or to the user in an automated system) for use in resolving the user inquiry. Agent 32 may use a predefined set of rules, experiences 34 and in the event a solution to the inquiry is not arrived at by the agent then a higher level of assistance, Second Layer Support 35, may be called upon for further support, e.g., a person having a higher level of knowledge of the product at issue. Upon resolution the service ticket or case number is stored as a record in Historical Data repository 206. PCSS 3 may then include the added HDR for consideration in similarity or feature extraction to incorporate the HDR in a clustering for use in resolving future inquiries.

Figure 3:
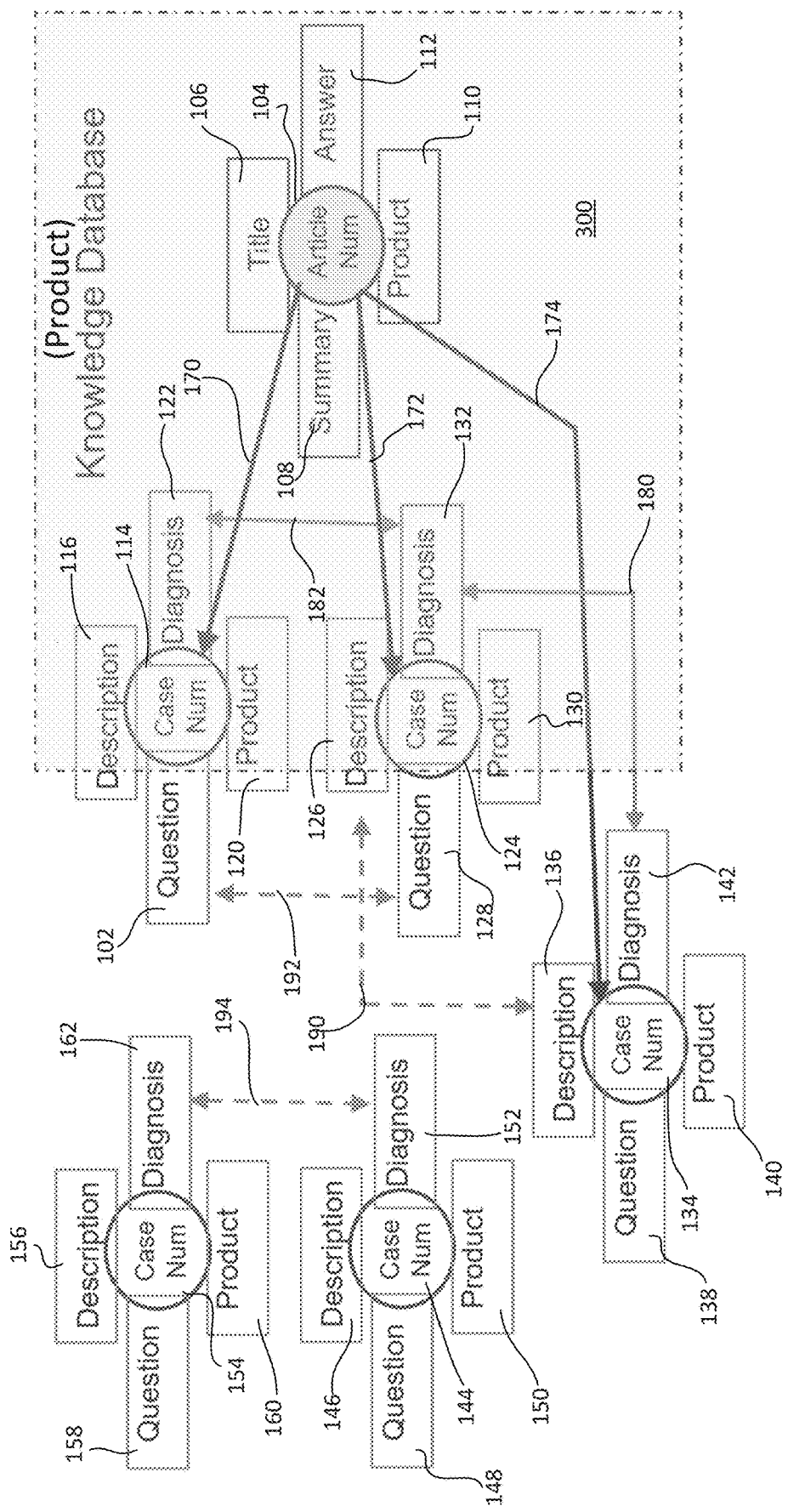
FIG. 3 is a further schematic diagram illustrating organized Custom Service Product Knowledge database and a part of recommendation database engine operations associated with the embodiment of FIG. 1.

Now referring to FIG. 3, a schematic diagram illustrates the creation of a product knowledge database PKD 300 from a set of electronic data files or records and using, for example, tagging and clustering techniques as supported by cluster tagging engine CTE 7. For example, features extracted from content or documents using content feature extraction module 4 may be used to build a hierarchical taxonomy or to supplement an existing taxonomy or tagged classification system by using scoring comparison module 11 to determine a score or determine similarity between one or more tagged features or documents. Links such as those shown with solid lines (180, 182) and hashed lines (190, 192, 194) are determined using the product customer support system PCSS 3. In the example of FIG. 3, Product Knowledge Database 300 is shown comprising Known Solution Record (KSR #1), represented as article 104, and two Historical Data Records (HDR #1 and HDR #2), represented as case numbers 114 and 124. Historical Data Records (HDR #4, HDR #5, and HDR #6), represented as case numbers 134, 144, and 154, are not included in the PKD 300. In particular, (HDR #3) case number 134 is excluded despite having a link 174 with article 104 and a strong link 180 between Diagnosis 132 and Diagnosis 142 and a weak link 190 between Description 126 and 136. PSCC 2/PKD 3 may use weighting and other processes to distinguish between relative importance of information fields, e.g., product field (which may be tagged data) may be weighed or emphasized over Description or Question fields. Over time and with changing relevance and scoring, case 134, for example, may be included in PKD 300. For instance, a user/customer may submit information either directly, in an automated system, or via an agent working with the user. A ticket or record is generated upon entry of a user service inquiry or complaint. Here, the agent receives information from a customer and may present the user with a series or set of questions designed to elicit additional information about the product or the problem. The agent may then formulate a query comprising a set of terms based on user responses and/or other information and submit the query to the PSCC 2/PKD 3, which in turn yields a set of responsive information, e.g., a list of documents or articles related to the product and/or problem. The set of results may include a set of Known Solution Records and/or a set of Historical Data Records. Similarity scoring and other threshold parameters may result in a reduced set of records to present to the agent (or to the user in the case of an automated system or an AI (Artificial Intelligence) agent for use in resolving the problem. In this example, a responsive cluster formed comprising KSR #1 (article 104), HDR #1 (case number 114) and HDR #2 (case number 124).

As illustrated, the hashed lines (190, 192, 194) indicate a relatively weak relevance or scoring between data elements or fields and the solid lines (180, 182) illustrate relatively stronger links or connections between features associated with respective cases or records (104, 114, 124, 134, 144, 154). In this example of FIG. 3, a KSR #1 article 104 comprises the following elements or features: a title 106, a summary 108, a product 110, and an answer 112. In the case of a customer support system to support a manufacturer's products sold to consumers, the article 104 may be related to a product 110, for example a refrigerator product, and may have a title including tagged or structured information classified based on the product or nature of the article. Summary 108 provides information about the product 110 and may include tagged or structured data. Answer 112 is related to product 110 and may also include tagged or structured data. In this manner the article 104 may be used in a knowledge database to efficiently connect other data records or inputs, for example a request from a product manager or a customer. The answer 112 may include a response or recommendation associated with product 110. For example, a part to be replaced or technical information related to repair or to address faulty operation of the associated product 110.

In this example the KSR #1 article 104 is linked with case 114, case 124, and case 134 (HDR #1, HDR #2, and HDR #3) by links 170, 172 and 174, respectively. Case 114 is related to product 120, case 124 is related to product 130, and case 134 is related to product 140. Products 120, 130, and 140 may be separate and distinct products, may be different models in a common line of products, or may be separate components (e.g., an ice maker) common to a given product or set of products. Product 110, for example, may be related to products 120, 130, and 140, which may be related products or components included in product 110. The determination of links 170, 172 and 174 may involve matching or scoring or otherwise determining one or more similarity measures or determinations across a number of fields stored in a database such as the Knowledge Database 300.

Cases may represent a document or other record and as shown here includes the following fields: description; question; product; and diagnosis. Descriptions 116, 126, 136, 146, and 156 may provide tagged or structured data related to a description associated respectively with a case or record 114, 124, 134, 144, and 154. The description, for example, may relate to a topic such as control instructions or specifications for operating a product. Questions 118, 128, 138, 148, and 158 may relate to tagged or structured data related to questions, for example, inputs received from customers having purchased the associated products. Diagnosis 122, 132, 132, 142, and 152 may relate to a set of instructions associated with corrective actions to be taken to address a problem or associated question related to the product operation or functioning or repair.

In one matter of operation a set of cases may be provided, for example by a product manager or product development team, upon release of a product anticipating inquiries from customers related to operation of the respective product. Such predefined cases or records may be supplemented over time by questions or inquiries received through the customer support system, e.g., from remote devices 13, from remote users or customers experiencing technical difficulties or problems with product operation. The product customer support system 3 may receive such inquiries and may identify and extract data as features associated with such inquiries received from remote users 12 and tag such data as features for use in determining similarity of those features. An ad hoc taxonomy or build network may be created or the tagged data may be used in connection with a Known Database with existing cases or records to link the inquiry with a known case, diagnosis, and recommendation for responding to the user inquiry.

In the example of FIG. 3, the PSCC 2/PKD 3 has determined a strong enough similarity between case 114, case 124, and case 134 to link those cases to article 104. Here a product knowledge database 300 associated with product 110 is formed based on the set of cases linked to KSR #1 article 104. In this example, link 180 is formed between diagnosis 132 and diagnosis 142, and link 182 is formed between diagnosis 122 and diagnosis 132, and in this manner forms a cluster about article 104 including cases 114, 124, and 134. The diagnosis may be a layer or level associated with a database or taxonomy for building a network or cluster used to efficiently handle customer inquiries and effectively respond to those inquiries. In this instance links 180 and 182 are sufficiently strong, that is there are sufficient similarities or other scored parameters, to link the respective fields or data.

In this example links 190, 192 and 194 also represent similarities or a score determination weakly linking, respectively, description 126 with description 136, question 118 with question 128, and diagnoses 152 and 162. However, because the product customer support system 103 determined the links 190, 192, and 194 to be relatively weak (e.g., failed to meet a threshold or other minimum requirement), cases 144, and 154 are not linked to article 104 and are not included in the cluster of cases 114, 124 and 134 associated with article 104. In operation of PSCC 2/PKD 3, over time case related data may be revised with new links formed and previous links dropped. For example, as additional user inquiries are received via user interface 110 and processed by PSCC 2/PKD 3, stronger links between one or more fields associated with cases may be realized and based on these changes clusters may be formed, reformed, or otherwise changed.

Figure 4:
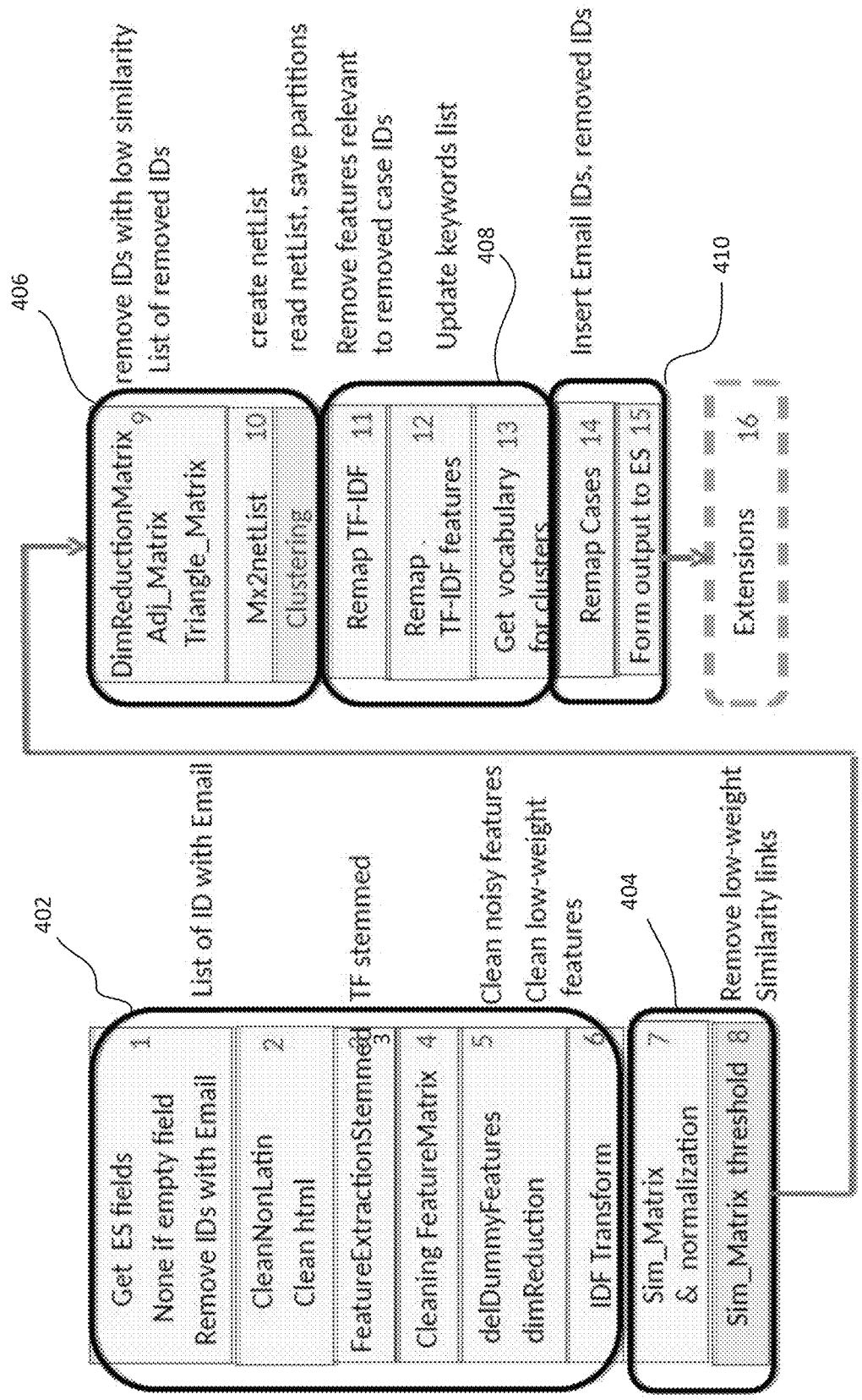
FIG. 4 is a flowchart representing additional clustering and tagging processes for use in connection with the present invention.

FIG. 4 is a schematic diagram illustrating an exemplary data processing flow or sequence of operation associated with one or more of the Discovery Engine 6, the Cluster Tagging Engine 7 and the Search Navigation Engine 8 associated with the PCSS 3 and PKD 2. In one embodiment and manner of operation, the Discovery Engine 6 includes a discovery mode for exploration of topics in a set of documents, including: unknown number of clusters (topics); unknown cluster volumes (# docs in cluster); standard methods such as k-mean require both parameters above to be known. The Discovery Engine 6 may be characterized as providing parameter-free, unsupervised clustering and may use community detection via random walk modularity maximization. As shown, process 400 includes a preliminary extraction and reduction process 402, which includes steps 401-2 through 402-6—(Get ES (Elastic Search database) fields/None if empty field/remove IDs with Email 402-1); (CleanNonLatin Clean html 402-2); (FeatureExtraction-Stemmed 402-3); (Cleaning FeatureMatrix 402-4); (del-DummyFeatures dimReduction 402-5); and (IDF (Inverse Document Frequency) Transform 402-6). Process 402 may be used to generate a list of keyword IDs (identifiers) with email, TF (Term Frequency) stemming, cleaning noisy features and clean/remove low-weight features. Next, a similarity normalization and similarity threshold process 404 may be used to remove low-weight similarity links, thus avoiding less relevant objects/keywords in the cluster. The process 404 includes steps 404-7 through 404-8—(Sim_Matrix & normalization 404-7); and (Sim_Matrix threshold 404-8). Process 406 may be used to: remove keyword IDs with low similarity and generate for further processing a list of removed keyword IDs; create a "netlist" of connectivity information, e.g., with a network of at least two interconnected nodes a list of connected nodes (e.g., documents or records) in a cluster; and read netlist and save partitions (e.g., in database management assign partitions based on criteria). In this example, process 406 includes steps 406-9 through 406-10—(DimReductionMatrix/Adj_Matrix/Triangle_Matrix 406-9); (Mx2netList 406-10) followed by unsupervised hierarchical clustering described below.

Classification and clustering (finding groups of similar elements in data) are well-known problems. If data are given in the relational format (causality or dependency relations), e.g., as a network consisting of N nodes and E edges representing some relations among the nodes, then the problem of finding similar elements corresponds to detection of communities, i.e., groups of nodes which are interconnected more densely among themselves than with the rest of the network.

Recently Newman et al. (Newman M E J, Girvan M (2004) Finding and evaluating community structure in networks. *Physical Review*, E 69, 026113; which is incorporated by reference herein in its entirety) introduced a new measure for graph clustering, named a modularity, which is defined as a number of connections within a group compared to the expected number of such connections in an equivalent null model (e.g., in an equivalent random graph). In particular, the modularity $Q$ of a partition $\mathcal{P}$ may be written as $$Q = \frac{1}{2m} \sum_{i,j} (A_{ij} - P_{ij}) \delta(c_i, c_j),$$

where $c_i$ is the i-th community; $A_{ij}$ are elements of graph adjacency matrix; $d_i$ is the i-th node degree, $d_i = \Sigma_j A_{ij}$; m is a total number of links, $m = \Sigma_i d_i/2$; $P_{ij}$ is a probability that nodes i and j in a null model are connected; if a random graph is taken as the null model, then $P_{ij} = d_i d_j/2m$.

By construction $|Q|<1$ and $Q=0$ means that the network under study is equivalent to the used null model (an equivalent random graph). Case $Q>0$ indicates a presence of a community structure, i.e., more links remain within communities than would be expected in an equivalent random graph. Hence, a network partition which maximizes modularity may be used to locate communities. This maximization is NP-hard and many suboptimal algorithms are suggested, e.g., see *Fortunato* (Fortunato S (2011) Community detection in graphs. *Physics Reports*, 486, pp. 75-174.) which is incorporated by reference herein in its entirety and references therein. In particular, we use dynamical formulation of modularity maximization based on a fast greedy search (described in Newman M E J (2004) Fast algorithm for detecting community structure in networks. *Physical Review*, E 69, 066133; and in Blondel V, Guillaume J L, Lambiotte R and Lefebvre E (2008) Fast unfolding of communities in large networks. *Journal of Statistical Mechanics: Theory and Experiment*, vol. 1742-5468, no. 10, pp. P10008+12; both of which are incorporated by reference herein in their entirety) extended with a random walk approach (described in Lambiotte R, Delvenne J C, Barahona M (2009) Laplacian Dynamics and Multiscale Modular Structure in Networks. *ArXiv:*0812.1770v3; which is incorporated by reference herein in its entirety) to detect multi-resolution communities beyond and below the resolution provided by max-modularity. In the following we used the methods above for hierarchical clustering. Note that it is fully unsupervised clustering without any parameters used.

As it was mentioned, modularity Q presents a clustering measure of a network and empirically found that Q>0.3 indicates a visible community structure. For a weighted graphs G (where each edge $e_{ij}$ connecting nodes i and j is associated with a real number called weight, $e_{ij} = w_{ij}$) the connectivity is characterized by weight distribution $p(w_{ij})$. Obviously, a presence even weak (lower weight) connections results in flattening community structure. In cases when network clustering results in Q<0.3 we iteratively apply an increasing threshold (FIG. 4, 404:8) to pruning weak connections within a similarity matrix until a community structure becomes visible. A downside of the edges pruning is that some nodes may become disconnected and, cannot be allocated to a cluster. Below we describe a method of the threshold selection optimizing clustering performance. Next at process 408, clustering results (cases grouped by clusters) are processed to remap features (keywords) to the detected clusters followed by another step of features cleaning. In particular, features relevant to removed case IDs are removed and keywords list for each cluster vocabulary is updated. Process 408 includes steps 408-11 through 408-13—(Remap TF-IDF 408-11); (Remap TF-IDF features 408-12); (Get vocabulary for clusters 408-13). Next, process 410 involves remapping cases to clusters and outputting to ES—Elastic Search database. The process 410 involves inserting email keyword IDs and removed keyword IDs (Remap Cases 410-14) (Form output to ES 410-15). The output of process 400 may then be further processed via extensions, examples of which are discussed below.

In one manner of operation, the discovery engine may compare the frequency of terms, i.e., keywords, that appear in one document against the frequency of those terms as they appear in other documents within a set, collection or corpus of documents. This aids the discovery engine in determining respective "importance" of the different terms within the document, and thus determining the best matching documents with respect to a given topic or subject. Two well-known techniques used in determining document relevance to terms are "term frequency" and "inverse document frequency." By using these approaches, one can determine whether to include (or not include) and in which order to rank documents satisfying a minimum relevance level. Term frequency (tf) essentially represents the number of times a term occurs in a document and inverse document frequency (idf) essentially reduces the weight or importance of terms that occur very frequently across a document collection and increases the weight or importance of those terms that occur infrequently. Idf essentially represents the inverse of the frequency of a term in the documents present in the document collection.

One widely used method for weighting terms appearing in a document against a collection of documents is called Term Frequency-Inverse Document Frequency (tf-idf)—essentially combining tf and idf techniques. Often, a two-prong normalization is provided in which: 1) rather than using absolute term counts (tf), relative frequencies are used and may be normalized to document length across a document set; and 2) idf is normalized across a document set or corpus. More specifically, tf-idf assigns a weight as a statistical measure used to evaluate the importance of a word to a document in a collection or corpus of documents. The relative "importance" of the term or word increases proportionally to the number of times or "frequency" such term or word appears in the document. The relative importance is offset by the frequency of that term or word appearing in documents comprising the corpus.

In one exemplary manner, tf as a statistic of the number of times a term (t) appears in a document (d) may be represented as a raw function of the number of times (frequency) the term appears in a document, tf=f(t,d), or weighted in one of several known manners, e.g., log normalization, double normalization 0.5, or double normalization K, see http://en.wikipedia.org/wiki/Tf-idf. In exemplary Equation (1), application of log normalization results in tf=f(t,d)=1+log $f_{t,d}$.

The idf statistic is expressed as the log($N/n_t$) (or alternatively to account for the instance of term t not appearing in any document d of the corpus D as the log($N/(1+n_t)$), where t is the term, N is the number of documents in the corpus (D) or collection (N=|D|); and $n_t$ is the number of documents d containing term t in the corpus D or otherwise stated as |{d∈D:t∈d}|.

The combined statistic tf-idf may then be expressed in smoothed expression as:

$$tf\text{-}idf(t,d,D)=tf(t,d)\cdot idf(t,D)=(1+\log f_{t,d})\cdot \log(N/(1+n_t)). \quad \text{(Eq. 1)}$$

In addition, variations of useful weighting schemes based on tf-idf are well known in the art and are typically used by engines as a way to score and rank a document's relevance to a subject or topic. Also, where there are multiple terms or pairs or n-grams or other segments under consideration, the document may be ranked by relevance based on summing the scores associated with each such term. The responsive documents may be ranked and clustered or tagged or classified or otherwise processed and a representation (e.g., as part of a node/edge directed graph or the like) or the document itself may be presented to an interested user based on relevance as well as other determining factors.

In the manner discussed above, the PSCC 2/PKD 3 uses tf-idf to select keywords or features to build the taxonomy and the keywords or features may be in the form of a combination of words, e.g., word pair, and may supplement such keywords using known or determined words based on semantic similarity or as synonyms. However, the PSCC 2/PKD 3 could also or alternatively use triples, tuples, n-grams, sliding windows, semantic methods and other iterative approaches. For example, given a known knowledge database an iterative approach may be used to confirm and select best approach by rebuilding a known database. In this manner variations based on database attributes may result in different approaches being selected for different types of PCSS or other systems.

Figure 5:
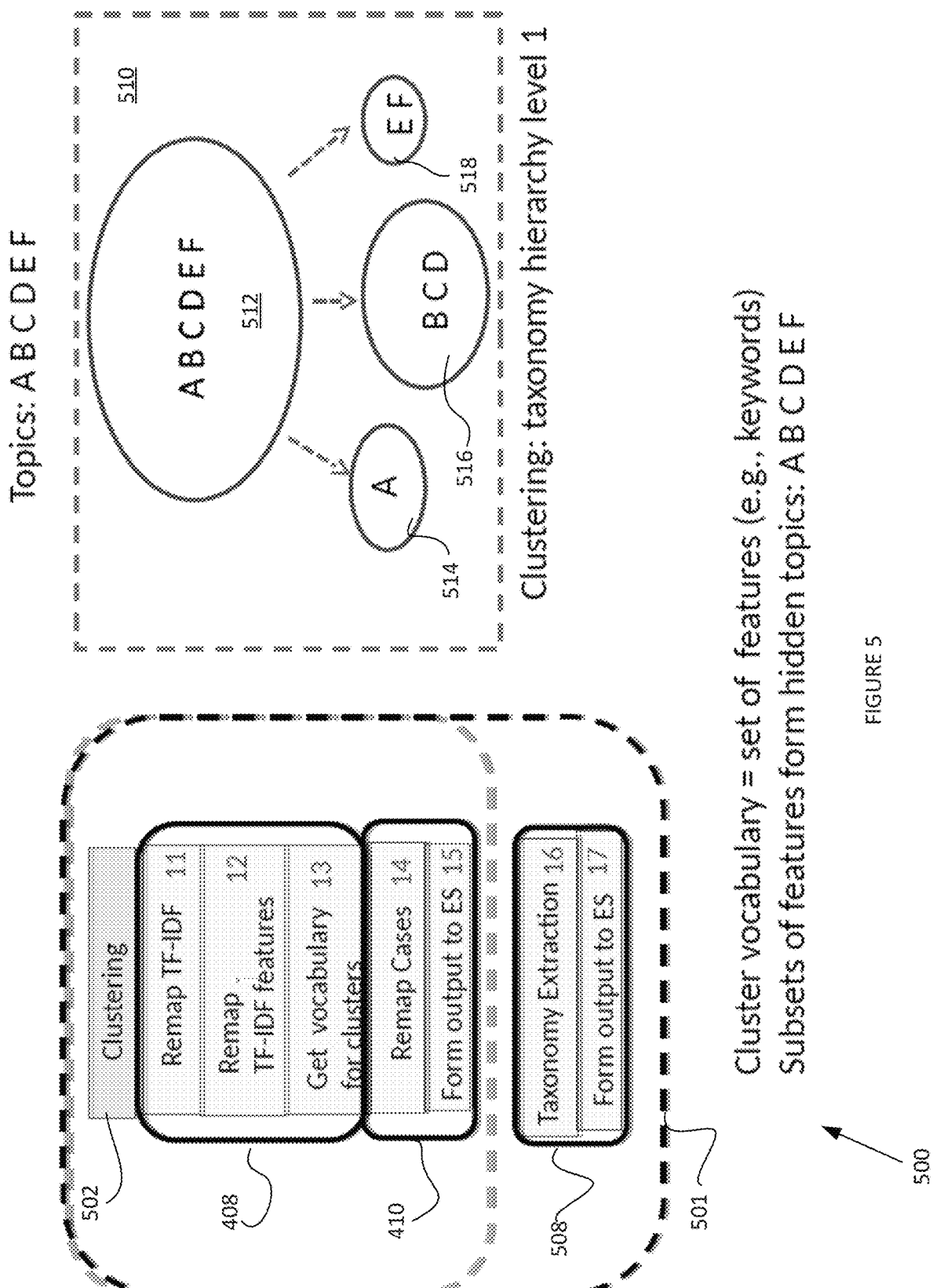
FIG. 5 is an exemplary additional processes representing clustering and taxonomy extraction related to components in accordance with the present invention.

FIG. 5 is a schematic diagram illustrating an exemplary data processing flow or sequence of operation associated with one or more of the Taxonomy Building Network 5, the Cluster Tagging Engine 7 and the Search Navigation Engine 8 associated with for the PSCC 2/PKD 3. The process 500 is used to arrive at the feature-based cluster or network 510 having a single taxonomy hierarchy level or level one. As shown, process 500 includes a set of processes 501 including: Clustering 502; remapping 408 and 410 and taxonomy extraction 508. More particularly, remapping process 408 includes steps 408-11 through 408-13—(Remap TF-IDF 408-11); (Remap TF-IDF features 408-12); and (Get vocabulary for clusters 408-13) as described above. Remapping may include use of TF-IDF (or tf-idf) and/or other linguistic and numerical statistical analysis and processes in mapping features. In operation, TF-IDF values are based on the number of times a term, word or word part appears in a document as offset by the frequency of the same term, word or word part appearing in a corpus of documents. It may be used as a weighting factor to score, rank or otherwise determine relevance, similarity, or other linking characteristic and may be used for recommendation purposes discussed below. TF-IDF along with other processes may also be used in the extraction process for example to filter stop-words and for summarization and classification or building taxonomy.

Remapping process 410 includes steps 410-14 through 410-15—(Remap Cases 410-14); and (Form output to ES 410-15) as described above. An extension process, taxonomy extraction process 508 includes steps 508-16 through 508-17—(Taxonomy Extraction 508-16); and (Form output to ES 508-17). The clustering process 501 involves remapping according to, for example tf-idf, and involves obtaining cluster vocabulary, which refers to a set of features (e.g., keywords). In this example, subsets of features form hidden topics. For example, and as shown in clustering graphical representation 510, a cluster vocabulary comprising the set of features represented as keywords or topic set 512 made up of topics A-F. Sub-sets of features or keywords 514, 516 and 518 are associated with cluster vocabulary 512. Subset 514 comprises the single topic or keyword "A", subset 516 comprises the features or keywords "B, C, and D", and subset 518 comprises the features or keywords "E and F." In this manner, the clustering is at a taxonomy hierarchy level 1.

Figure 6:
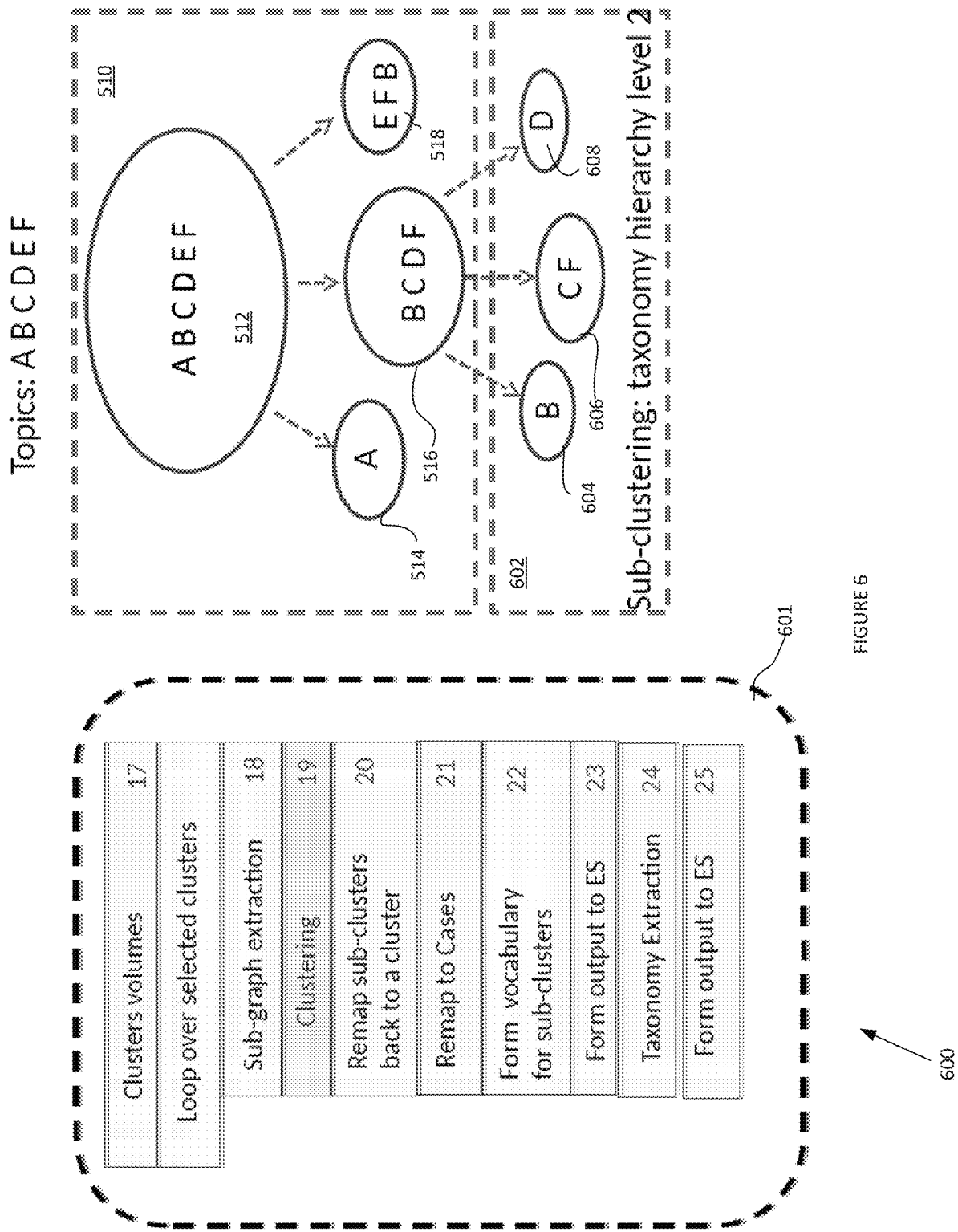
FIG. 6 is an exemplary schematic illustrating additional processes representing hierarchical clustering and taxonomy extraction at hierarchy level 2 in accordance with the present invention.

FIG. 6 is a schematic diagram illustrating a further extension of the exemplary data processing flow or sequence of operation for the PSCC 2/PKD 3 of FIG. 5. As shown, process 600 provides an example of the sub-clustering process as a taxonomy hierarchy level two and includes a set of processes 601 including: (Clusters volumes 601-17) (Loop over selected clusters) (Sub-graph extraction 601-18) (Clustering 601-19) (Remap sub-clusters back to a cluster 601-20) (Remap to Cases 601-21) (Form vocabulary for sub-clusters 601-22) (Form output to ES 601-23) (Taxonomy Extraction 601-24) (Form output to ES 601-25). As with FIG. 5, subsets of features form hidden topics A-F 512. In one manner of operation PSCC 2/PKD 3 remaps to break links (or devalue links) to form sub-clusters. For example, and as shown in clustering graphical representation 510, a cluster vocabulary comprising the set of features represented as keywords or topic set 512 made up of topics A-F. In this example, remapped sub-sets of features or keywords 514, 516 and 518 are associated with cluster vocabulary 512. Subset 514 still comprises the single topic or keyword "A", remapped subset 516 has been changed and now comprises the features or keywords "B, C, D and F", and remapped subset 518 has been changed and now comprises the features or keywords "E, F and B." In this further extension, the clustering process is extended to include sub-clustering to add a taxonomy hierarchy level 2 602 comprising sub-subsets 604 (comprising feature B), 606 (comprising features C and F) and 608 (comprising feature D). Selecting distinct or non-overlapping features is a way to break or divide the cluster into sub-clusters.

Figure 7:
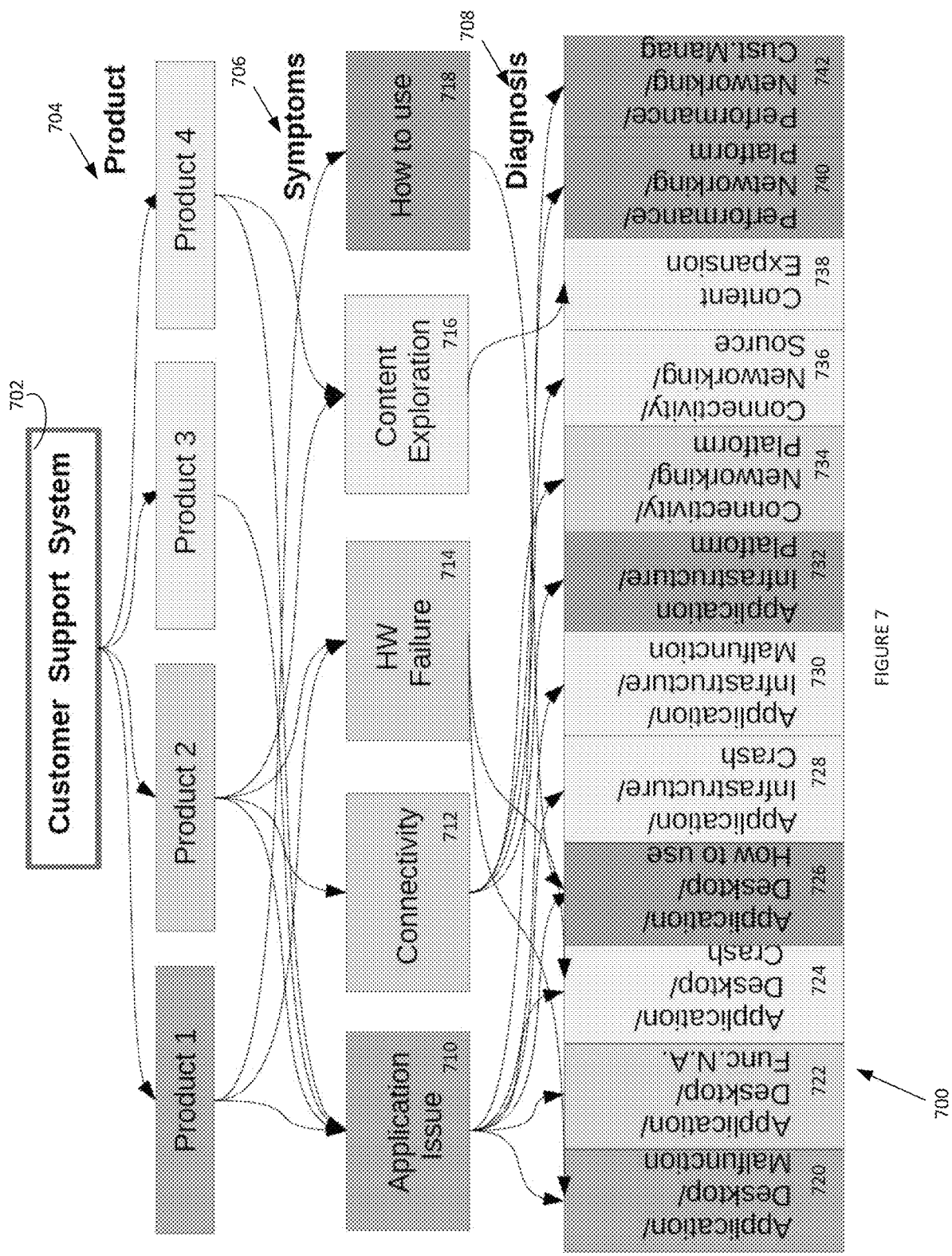
FIG. 7 is a schematic diagram illustrating an exemplary part of PCSS database structure in accordance with the present invention.

FIG. 7 illustrates an exemplary taxonomy build 700 manually built based on cases from a search query over Product 1-Product 4. In this example, a taxonomy for implementing a customer support system 702 is shown for processing queries related to a set of four products—Product 1 through Product 4. The taxonomy 700 includes a high or primary level Product features or topics 702, a secondary or sub-level set of symptoms features 706, and a tertiary or sub-sub-level set of diagnoses features 708. A network or matrix of symptoms 710-718 includes symptom level features "Application Issue" 710, "Connectivity" 712, "HW (hardware) Failure" 714, "Content Exploration" 716 and "How To Use" 718. This represents a high level of key issues related to the set of Products 1-4. Below the Symptom level 706 is the Diagnosis level 708 comprising a set of Diagnosis features linked by Customer Support System 702 to one or more of the Product level 704 products and to one or more of the Symptom level 706 features: Application Issue 710; Connectivity 712; HW Failure 714; Content Exploration 716; and/or How to use 718. In this example, the shading indicates respective relative numbers of cases in different categories: High—(Product 1, Application Issue 710, and diagnosis 720); Medium—(Product 2, Connectivity 712, HW Failure 714, and diagnoses 722 and 734); Small—(Products 3 and 4, Content Exploration 716, and diagnoses 724, 728, 730, 736, and 738); and Very Small (e.g., =1) (no Product, How to Use 718, and diagnoses 726, 732, 740, and 742). The relative numbers or ranking represent the relevance determined and links formed as related to formation of clusters and may be graphically represented using nodes and edges, e.g., in a directed graph.

Figure 8:
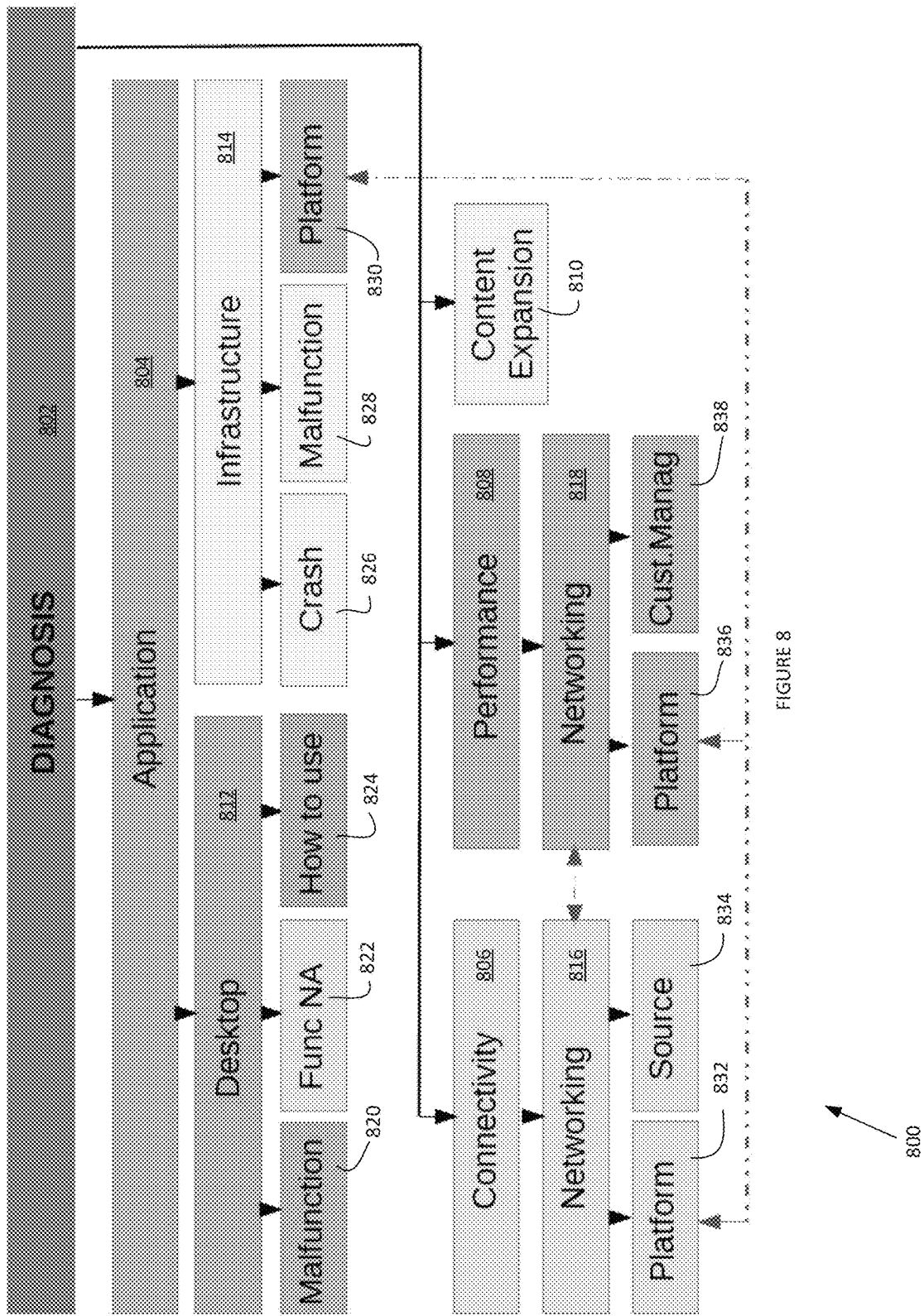
FIG. 8 is a schematic diagram illustrating an exemplary Taxonomy Build associated with a Diagnosis field.

FIG. 8 illustrates an example of Diagnosis Taxonomy Build 800 manually built from a set of data resulted from a data query over Product 1: Symptoms: Application Issue for a Diagnosis field. It shows a primary level topic or feature (Diagnosis 802), secondary level features or topics (Application 804, Connectivity 806, Performance 808, and Content Expansion 810), tertiary level features (Desktop 812, Infrastructure 814, Networking 816/Networking 818), and fourth-level features (Malfunction 820/828, Func NA 822, How to use 824, Crash 826, Platform 830/832/836, Source 834, and Customer Management 838). In this example, the shading indicates respective relative numbers of cases in different categories: High—(L1—Diagnosis 802/L2—application 804/L3—desktop 812 and L4—malfunction 820); Medium—(L2 Connectivity 806, Networking 816, Platform 832 and Source 834 along with Func NA 822); Small—(Infrastructure 814, Crash 826, Malfunction 828 along with Content Expansion 810); and Very Small—(e.g., equals 1) (L2—Performance 808, Networking 818, Platform 836 and Cust. Manag 838 along with How to use 824 and platform 830). The relative numbers, i.e., high; medium; small; and very small, represent the relative importance of instances determined in the taxonomy. Links formed as related to the taxonomy and may be represented using nodes and edges to build a directed graph.

Figure 9:
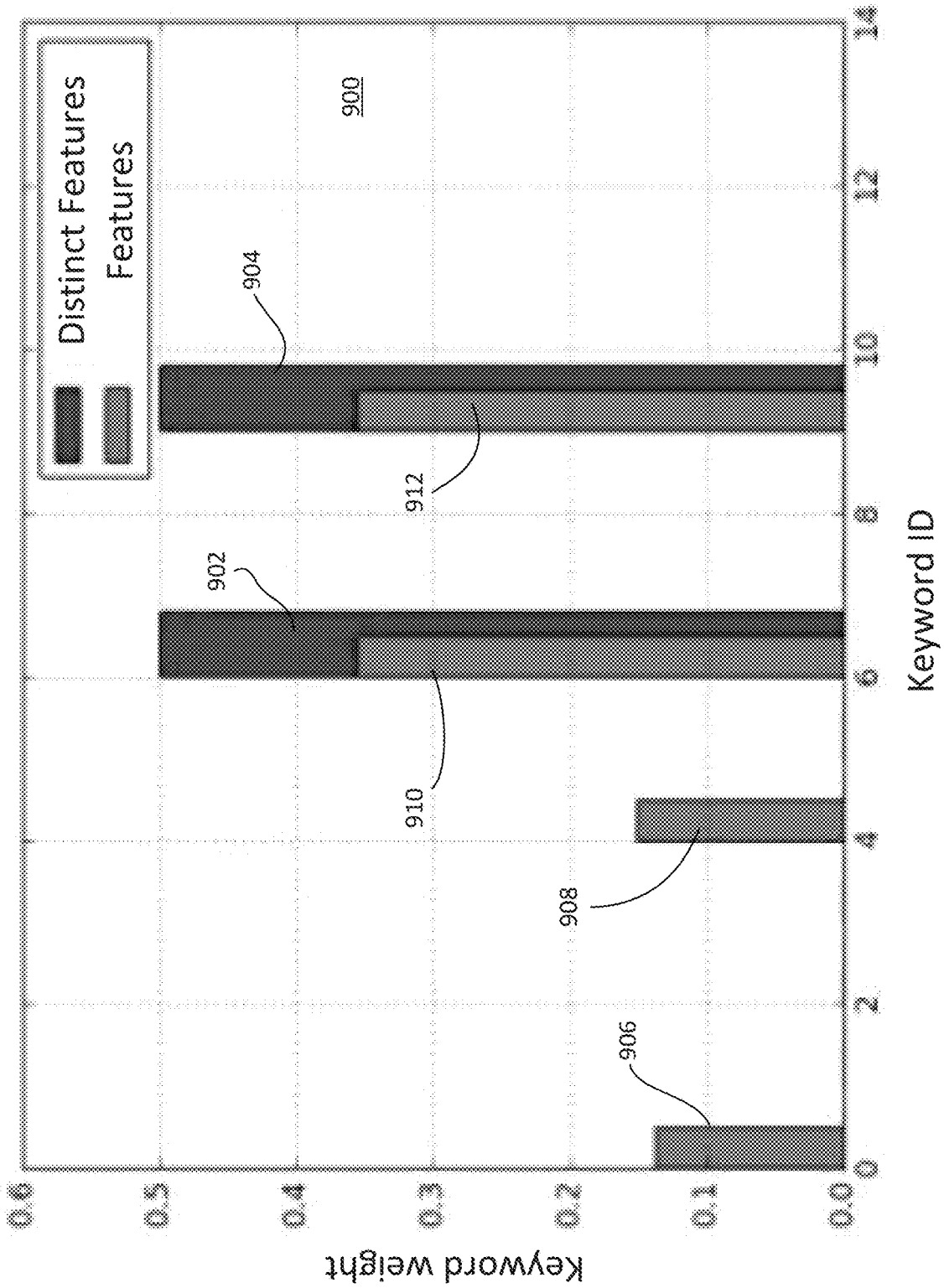
FIGS. 9-11 are graphical representations of overlapping and distinct features associated with keywords vs keyword weights in relation to the taxonomy build.
Figure 10:
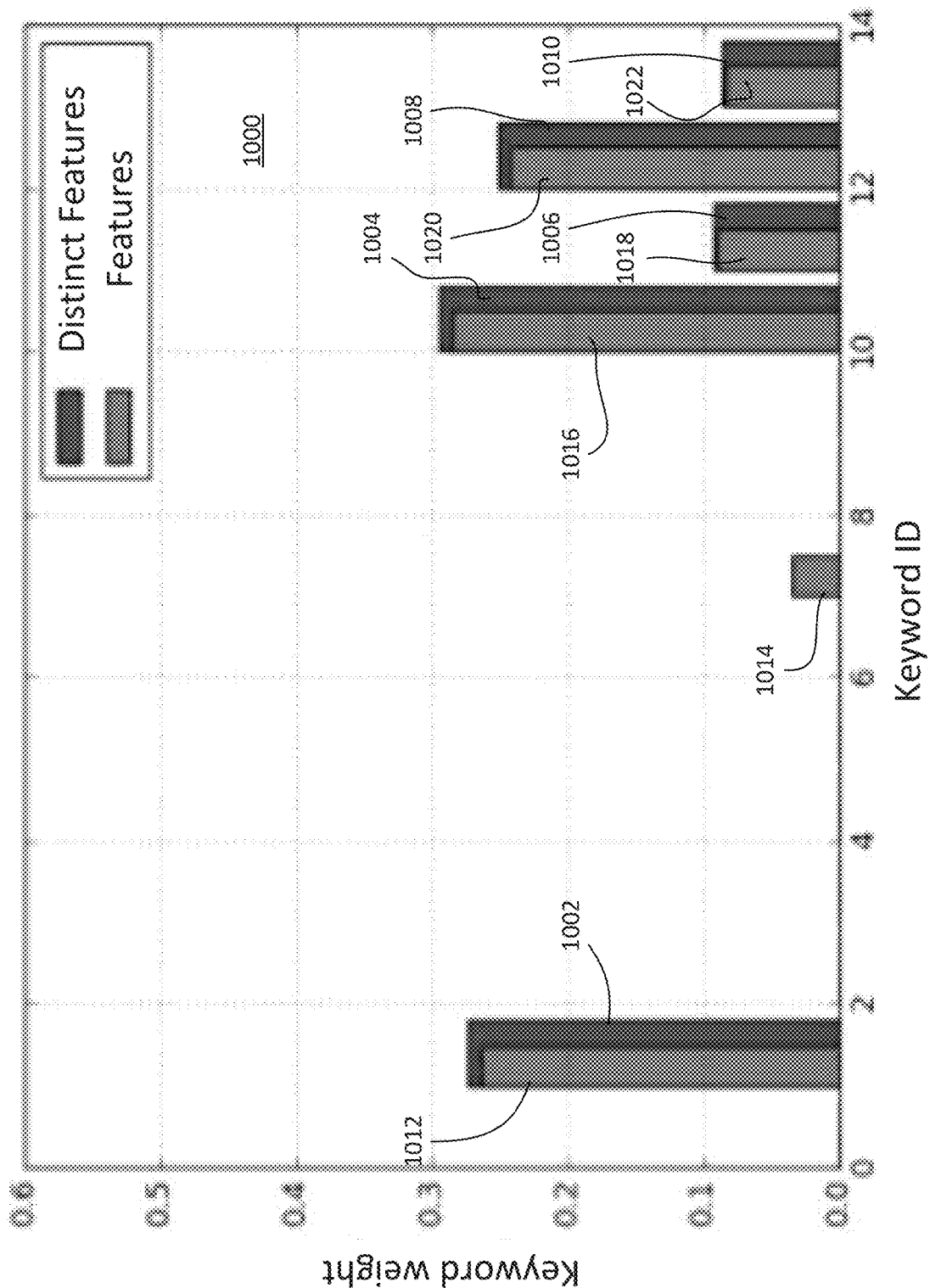
Figure 11:
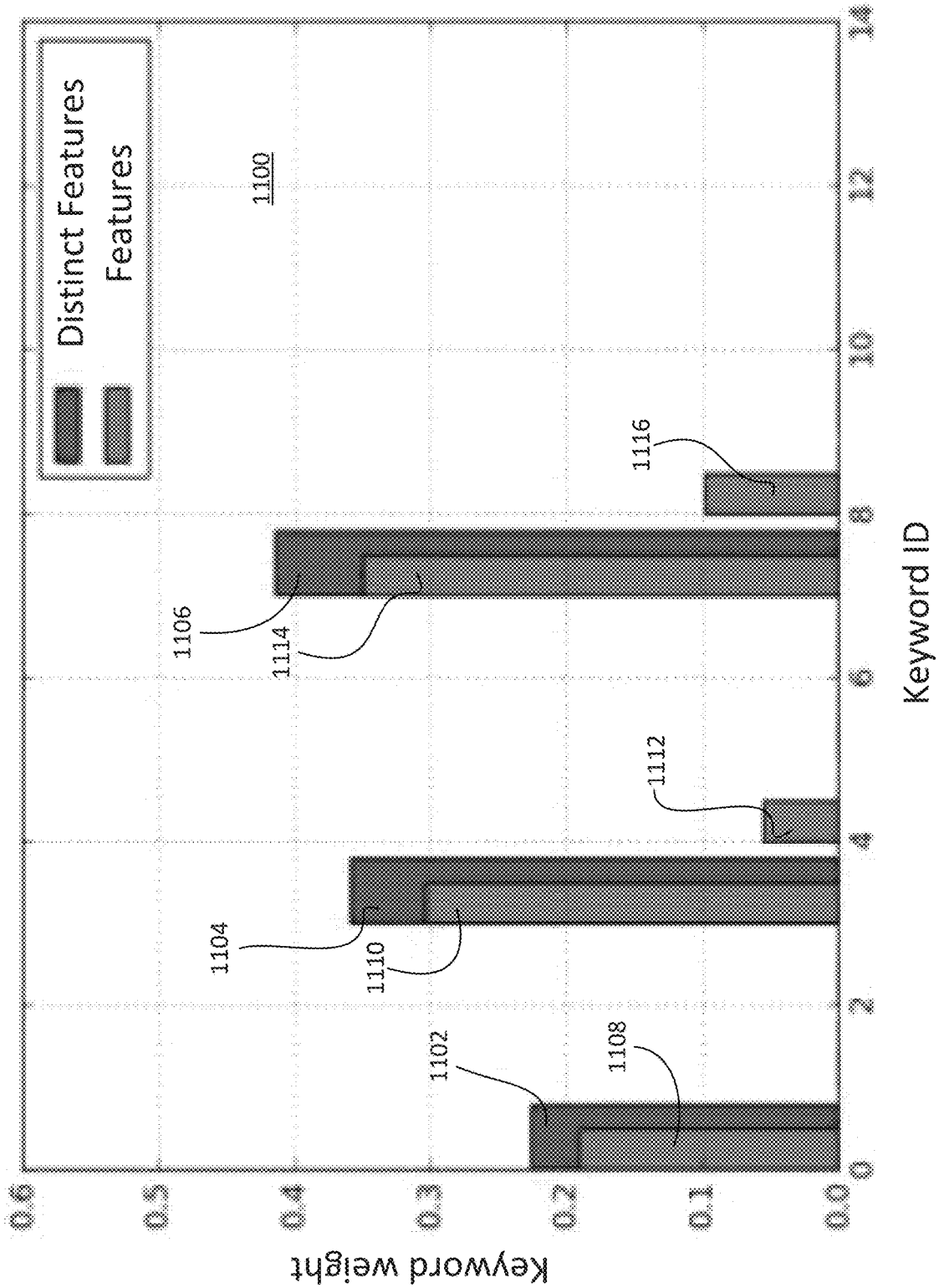
Figure 12:
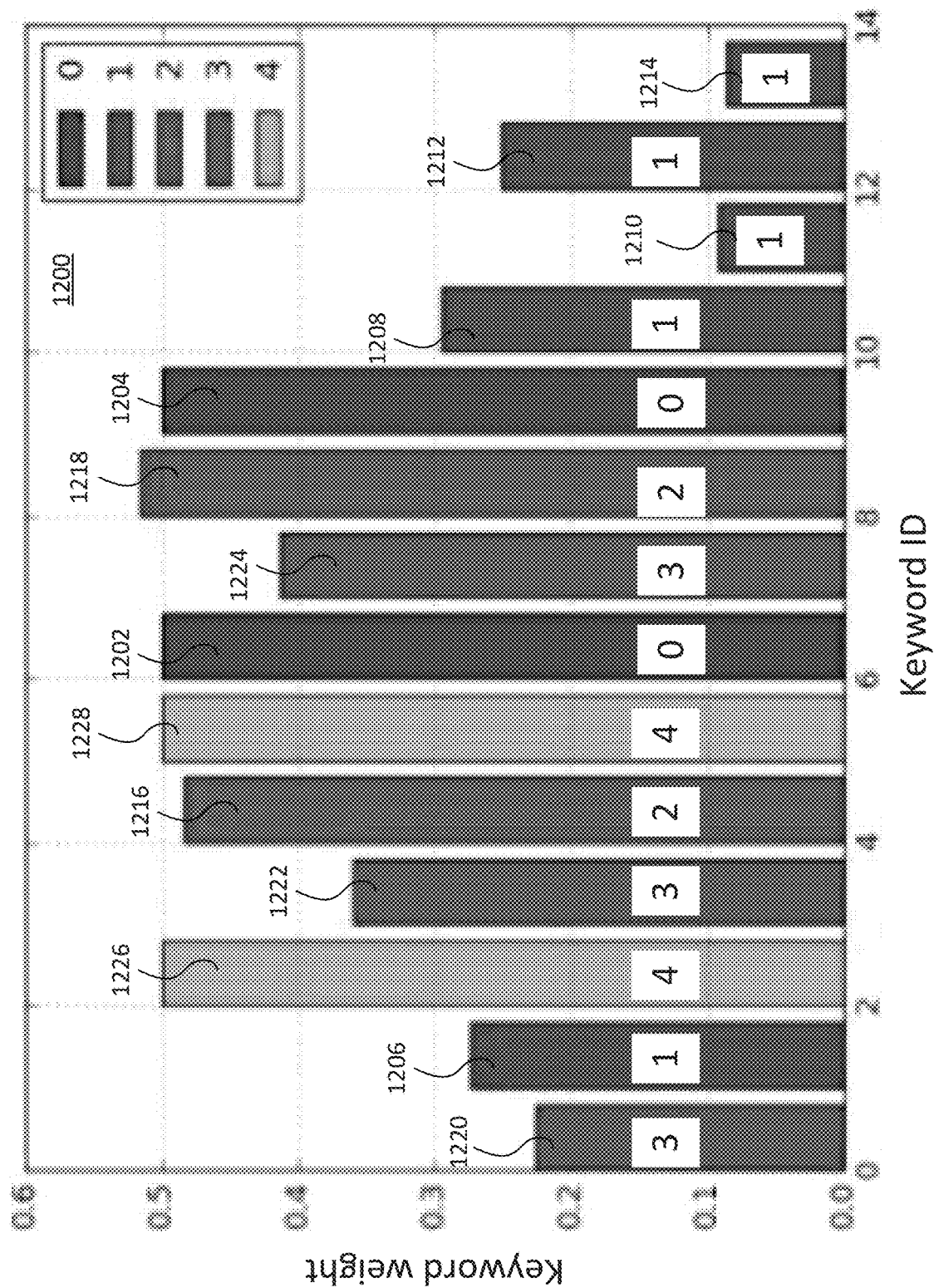
FIG. 12 is a graphical representation of the distinct features associated with keywords vs keyword weights in relation to the taxonomy build.

FIGS. 9-12 illustrate operation of PSCC 2/PKD 3 using unsupervised taxonomy extraction to yield resulting cluster fingerprints with and without overlapping as a function of features and distinct features, i.e., keywords. In this set of examples there are 15 (0-14) features/distinct features. FIG. 9 illustrates a graphical representation 900 of the feature set plotted by keyword weight vs keyword ID for the set of distinct features 902, 904 and features 906, 908, 910, 912. FIG. 10 illustrates a graphical representation 1000 of the feature set plotted by keyword weight vs keyword ID for the set of distinct features 1002, 1004, 1006, 1008, 1010 and features 1014, 1016, 1017, 1018, 1020, 1022. FIG. 11 illustrates a graphical representation 1100 of the feature set plotted by keyword weight vs keyword ID for the set of distinct features 1100, 1102, 1104, 1106 and features 1108, 1110, 1112, 1114, 1116. FIG. 12 illustrates a graphical representation 1200 of the distinct features set (0-14) plotted by keyword weight vs keyword ID for the full set of cluster vocabulary 1200. In this instance features are grouped or identified to represent clusters, i.e., cluster ID_0 (1202, 1204), cluster ID_1 (1206, 1208, 1210, 1212, and 1214), cluster ID_2 (1216 and 1218), cluster ID_3 (1220, 1222, and 1224), and cluster ID_4 (1226 and 1228).

Figure 13:
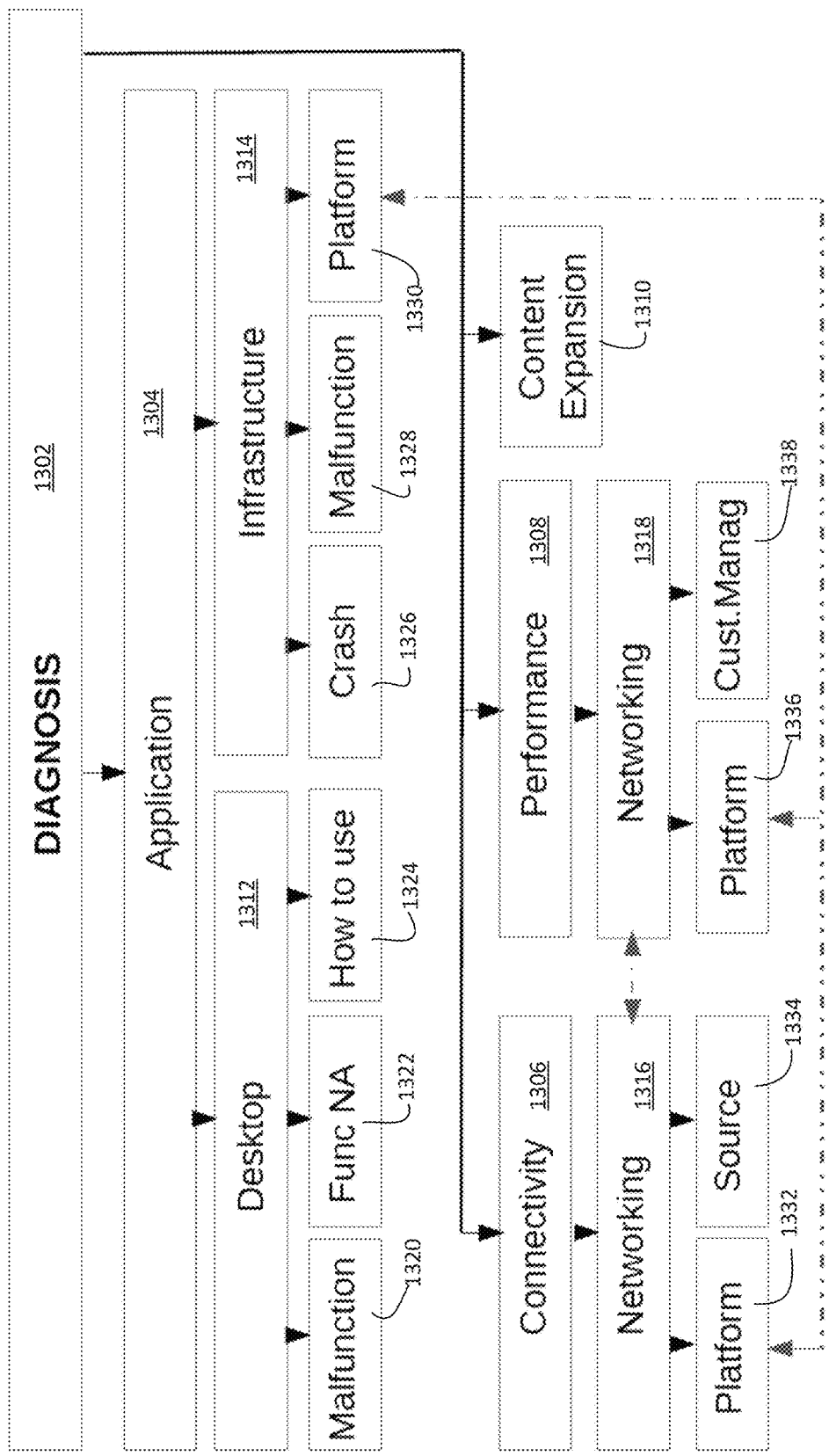
FIGS. 13-20 are schematic diagrams of stages and branches associated with a Taxonomy build and Derived Diagnosis Taxonomy.

FIG. 13 illustrates the test Diagnosis Taxonomy to be automatically derived by the PSCC 2/PKD 3 using clustering over the same cases used to manually build taxonomy shown at FIG. 8 with primary topic or keyword DIAGNOSIS 1302. Secondary topics or keywords include Application 1304, Connectivity 1306, Performance 1308, and Content Expansion 1310. Sub-level or tertiary keywords or features comprise Desktop 1312, Infrastructure 1314, Networking 1316/Network 1318. The fourth-level features are Malfunction 1320, Func NA 1322, How to use 1324, Crash 1326, Malfunction 1328, Platform 1330, Platform 1332, Source 1334, Platform 1336, and Cust. Manag 1338. Arrows represent keyword or feature links among the levels.

Figure 14:
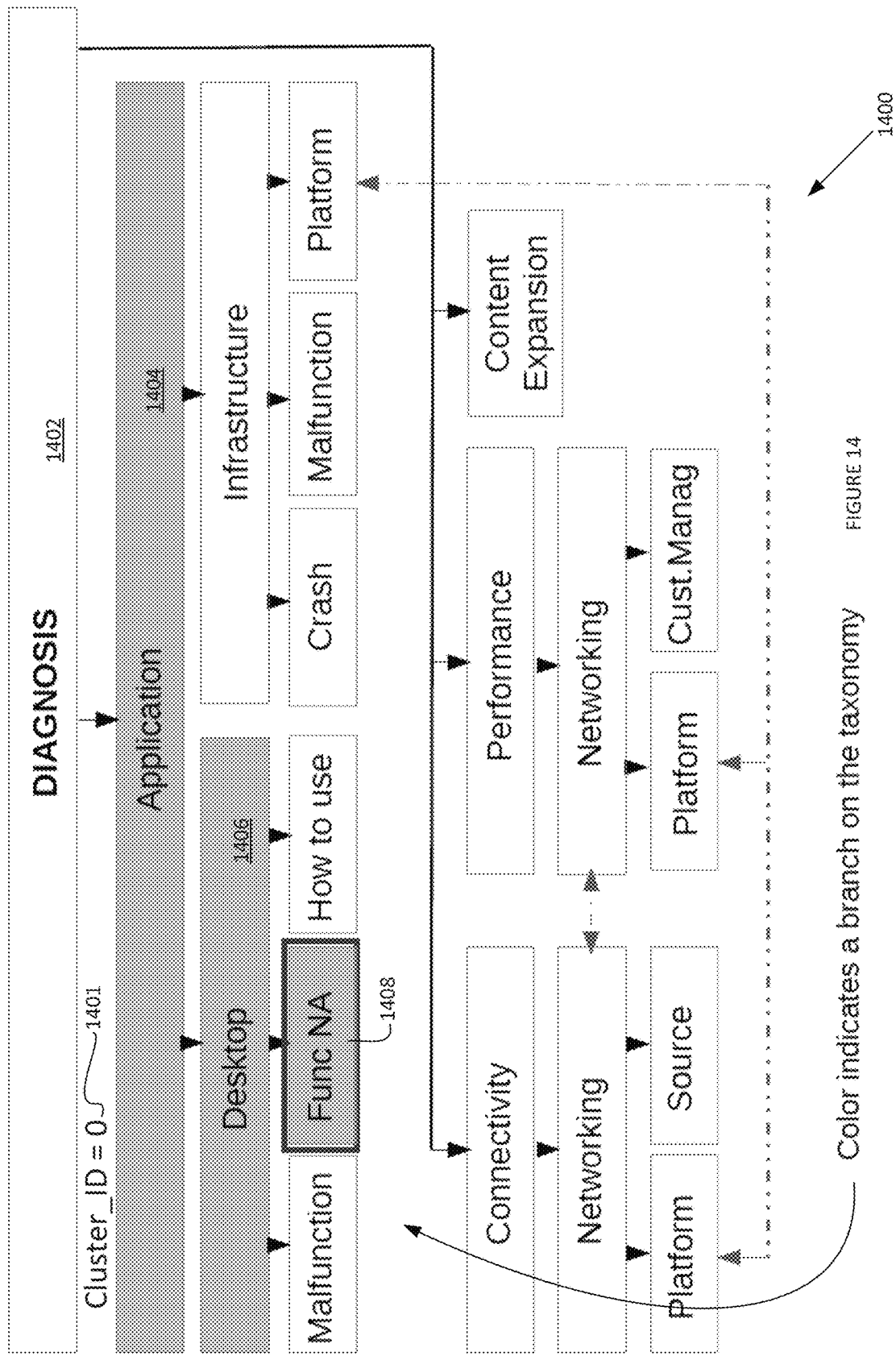

FIG. 14 illustrates use of the PCSS 3 in a first stage to generate Automatically Built Taxonomy: Stage 1 representing a Diagnosis Cluster ID=0 1401. In this example, with the diagram showing a tree-like structure, the DIAGNOSIS 1402 branch established is comprised of Application 1404/Desktop 1406/Func NA 1408 features. This branch represents features determined to be most highly relevant and most highly scored. For example, even if other links or branches are found, if those links or branches are relatively weak, i.e., the relevance or association is relatively weak, then the features are not included as linked clusters to the root topic, e.g., Diagnosis 1402 or subtopic, e.g., Application 1404. Clusters may be shown and distinguished using colors or shading to reflect high-value links in a tree-structure or may be represented as clusters using node/edge elements.

Figure 15:
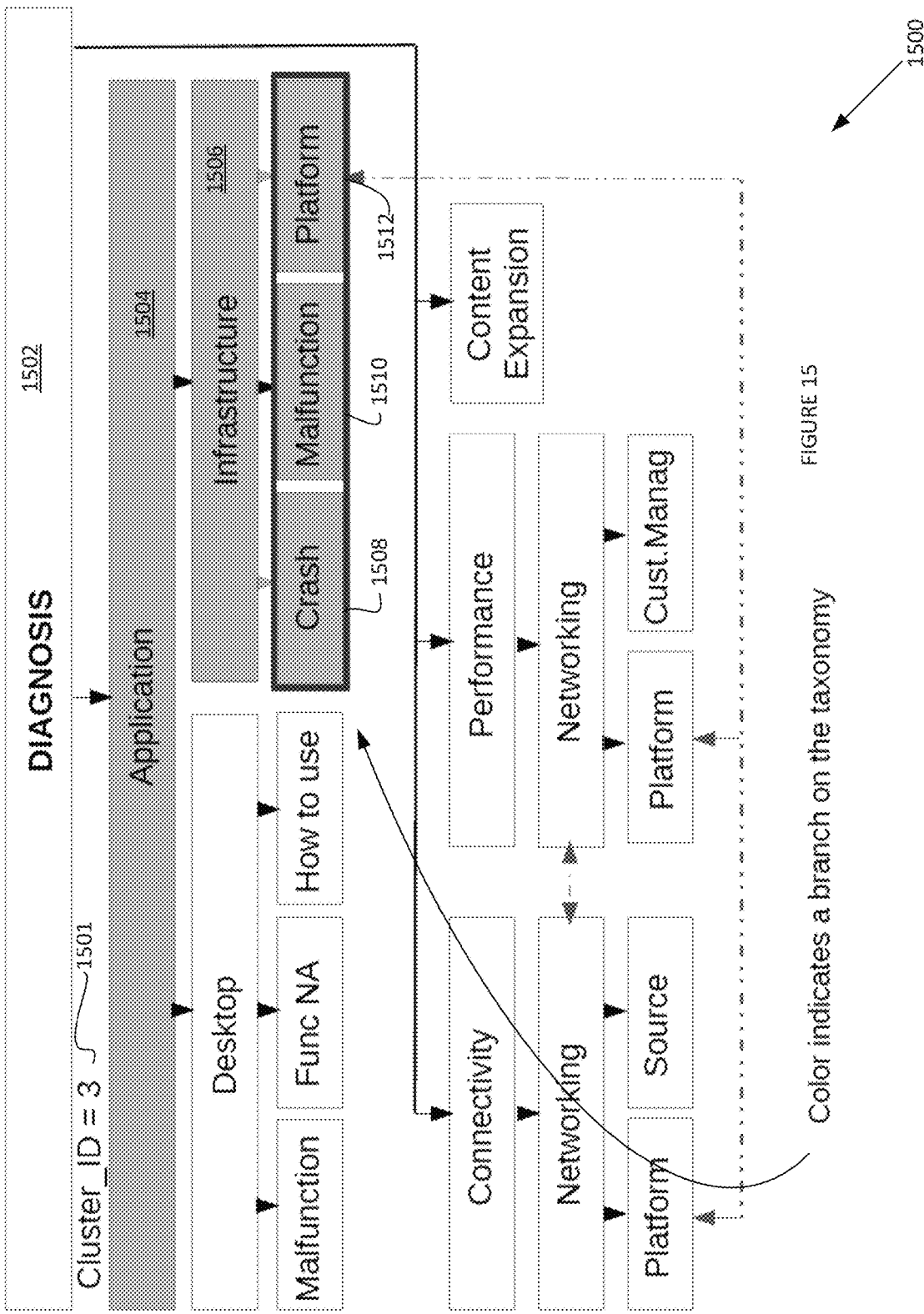

FIG. 15 illustrates use of the PCSS 3 in a first stage to generate Automatically Built Taxonomy: Stage 1 (cf. 510) representing a Diagnosis Cluster ID=3 1501. In this example, with the diagram showing a tree-like structure, the DIAGNOSIS 1502 branch established is comprised of Application 1504/Infrastructure 1506/Crash 1508, Malfunction 1510, and Platform 1512 features.

Figure 16:
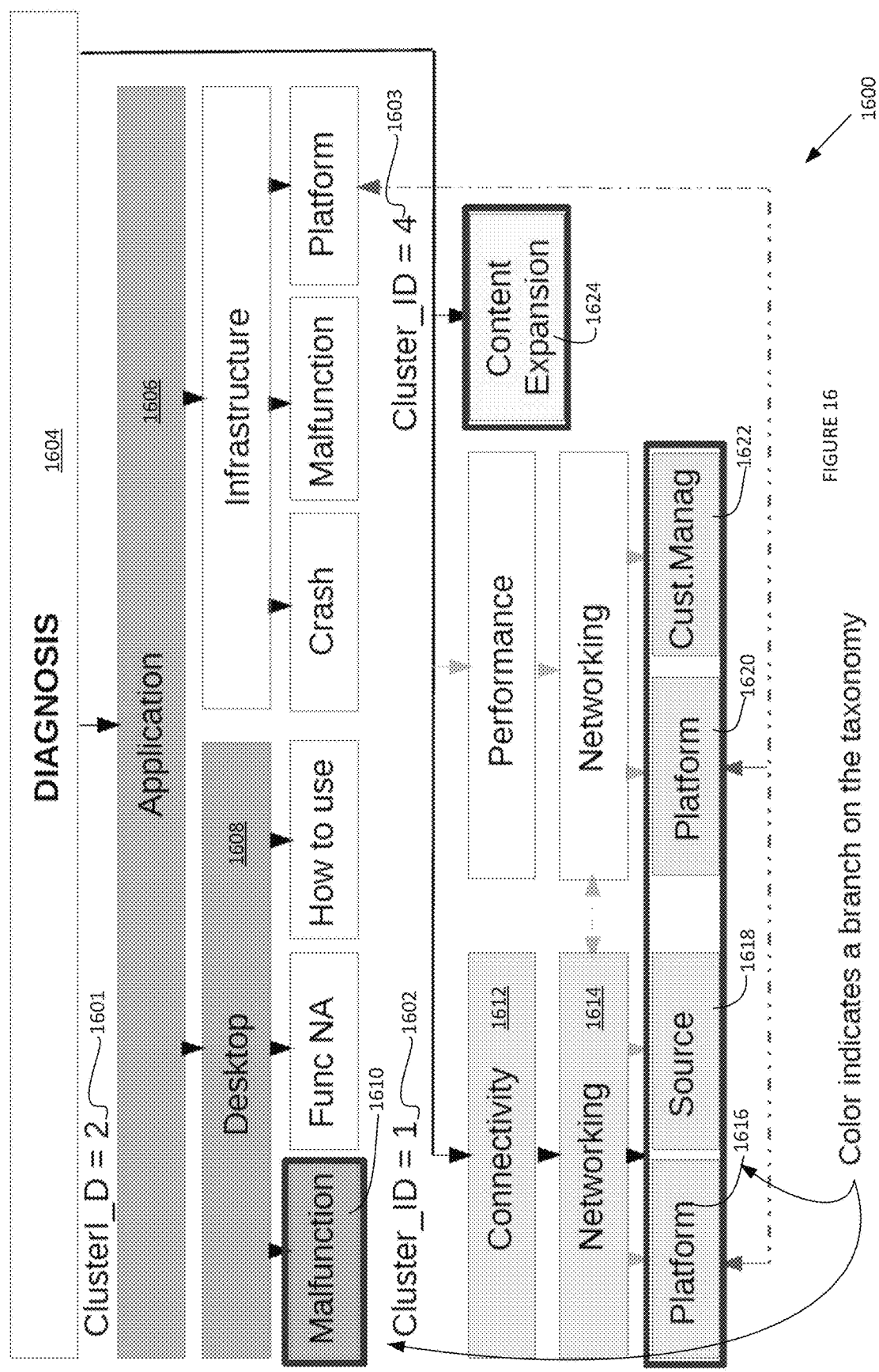

FIG. 16 illustrates use of the PCSS 3 in a first stage to generate Automatically Built Taxonomy: Stage 1 representing three clusters: Diagnosis Cluster_ID=2 1601, Cluster_ID=1 1602, and Cluster_ID=4 1603. In this example, with the diagram showing a tree-like hierarchy structure, the DIAGNOSIS 1606 branch established is comprised of Application 1606/Desktop 1608/Malfunction 1610 features. This branch represents features determined to be most highly relevant and most highly scored. In this example, a second cluster Cluster_ID=1 1602 is formed and determined to be relevant but not as highly relevant or as highly scored as cluster ID=2 1601. Here, a third cluster, Cluster_ID=4 1603 Diagnosis 1604/Content Expansion 1624 is shown as being weak but included at this stage 1 of the taxonomy build. In this example, Cluster_ID=1 1602 is shown to comprise DIAGNOSIS 1604/Connectivity 1612/Networking 1614/Platform 1616 and Source 1618 features. Note that even though the features Platform 1620 and Customer management 1622 appear in documents, the path through topics Performance/Networking (which do not appear in the documents) is too weak and related Platform 1620 and Cust. Manag 1622 features are not included in this Stage 1 taxonomy build, e.g., too few documents with platform and customer management features.

Figure 17:
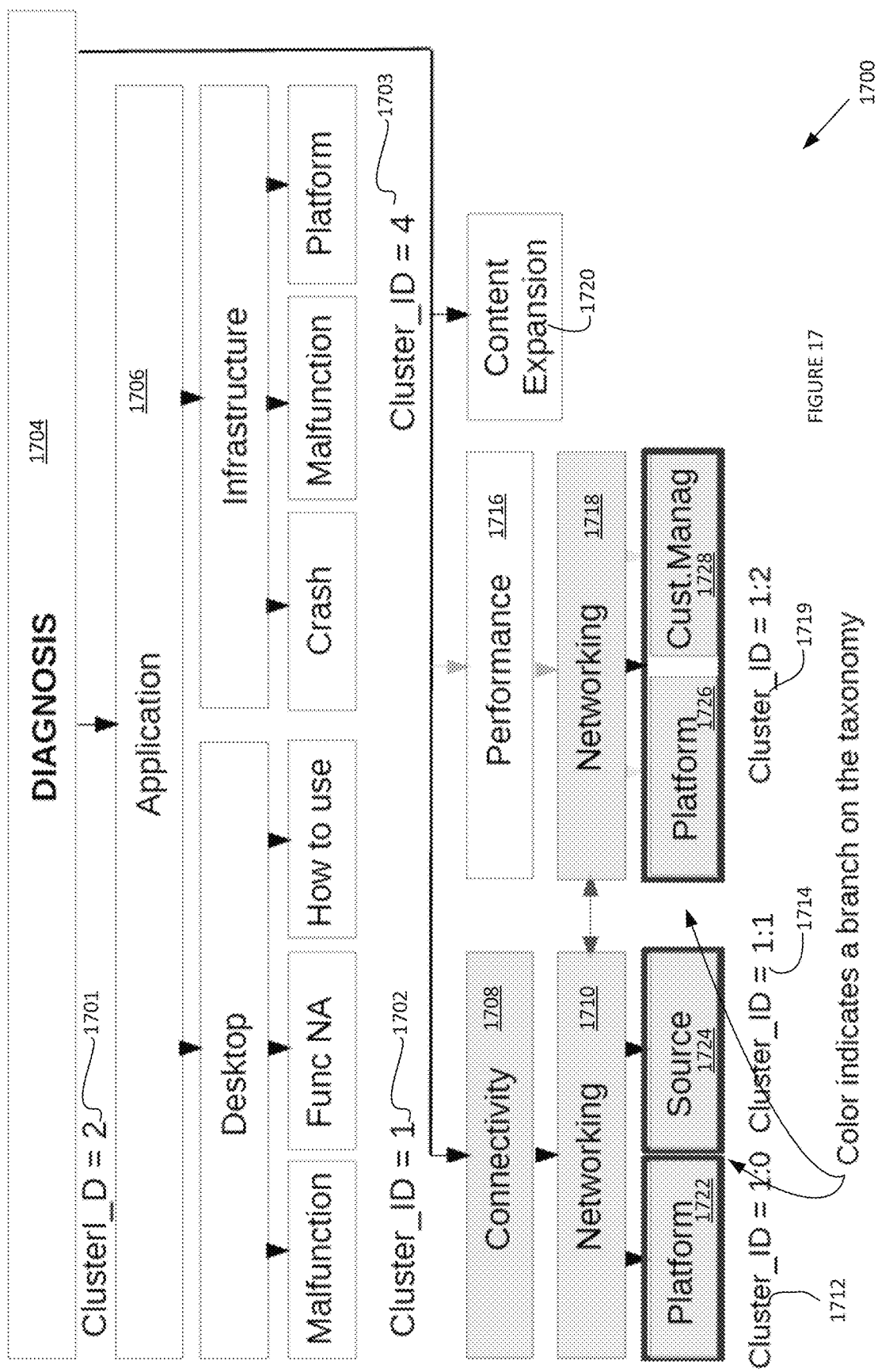
Figure 18:
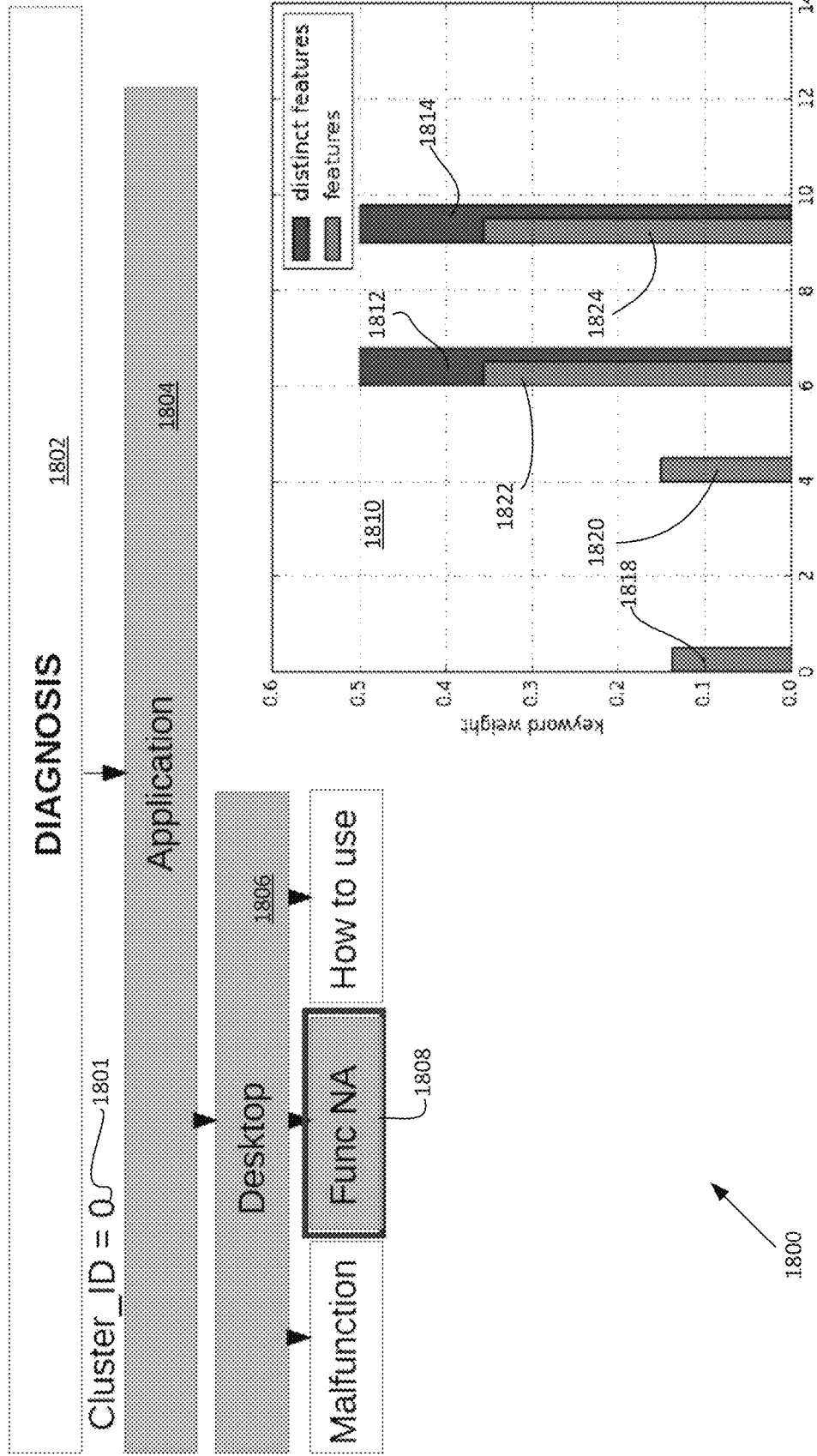

FIG. 17 illustrates use of the PCSS 3 in a second stage to generate Automatically Built Taxonomy: Stage 2 (cf. sub-clustering 602) representing three clusters: Diagnosis Cluster_ID=2 1701, Cluster_ID=1 1702, and Cluster_ID=4 1703. In this example we focus on Cluster_ID=1 1602 derived at the Stage 1 shown at FIG. 16. At this stage the sub-clustering for 1602 split the lower level features 1602 (1616, 1618, 1620, 1622) and resulted in three sub-clusters Cluster_ID=1:0 1712, Cluster_ID=1:1 1714 and Cluster_ID=1:2 1719. In particular, Cluster_ID=1:0 1712 comprises a taxonomy branch DIAGNOSIS 1704/Connectivity 1708/Networking 1710/Platform 1722; Cluster_ID=1:1 1714 DIAGNOSIS 1704/Connectivity 1708/Networking 1710/Source 1724; Cluster_ID=1:2 1716 DIAGNOSIS 1704/Connectivity 1708/Networking 1710/Platform 1726, Cust. Manag. 1728. Here the build excluded cluster DIAGNOSIS 1704/Performance 1716/Networking 1718/Platform 1726, Cust. Manag. 1728 due to very small number of cases associated with a taxonomy branch (or a cluster) formed by 808, 818, 836, 838. However, in this instance the system split this cluster and formed an additional sub-cluster_ID=1:2 comprised of Platform 1726 and Cust. Manag. 1728 features due to the strength of the scoring and relevance of those two features to the root topic Diagnosis 1704. This is an example of splitting clusters based on common keywords FIG. 18 illustrates an exemplary Taxonomy Branch 1800 and its Cluster Fingerprint 1810 associated with Cluster_ID=0 1801. Here the Taxonomy Branch 1800 comprises root DIAGNOSIS 1802/Application 1804/Desktop 1806/Func NA 1808. Here, Func NA 1808 is a "leaf" in the taxonomy tree. Note that features Malfunction and "How to Use", also taxonomy leaves, are not included in this cluster since Malfunction 1620 belongs to another Cluster_ID=2 1601 and "How to Use" 824 is excluded due to very small number of cases as depicted at FIG. 8. As shown, cluster fingerprint 1810 comprises normalized distinct features 1812 (Func) (at keyword ID #6 with weight 0.5) and 1814 (NA) (at ID #9 with weight 0.5), and all cluster relevant normalized features 1818 (Application) (at ID #0 with weight 0.14), 1820 (Desktop) (at ID #4 with weight 0.15), 1822 (Func), and 1824 (NA). Recall that the cluster features weights here correspond to IDF ranking indicating uniqueness or "specificity" of features. On the other hand, distinct features (extracted at a given level from clustering and remapping 406, 408, 501, 601) are non-overlapping features uniquely describing each cluster. It is easy to show that due to its uniqueness the largest distinct feature corresponds to a leaf at a selected taxonomy level. Then a cluster taxonomy branch may be reconstructed based on cluster features ranked according to IDF. It is illustrated at FIG. 18, where distinct features 1812, 1812 correspond to the taxonomy leaf 1808, and normalized ranking for all features 1824, 1822, 1820, 1818 corresponds to DIAGNOSIS taxonomy branch 1808, 1806, 1804.

Figure 19:
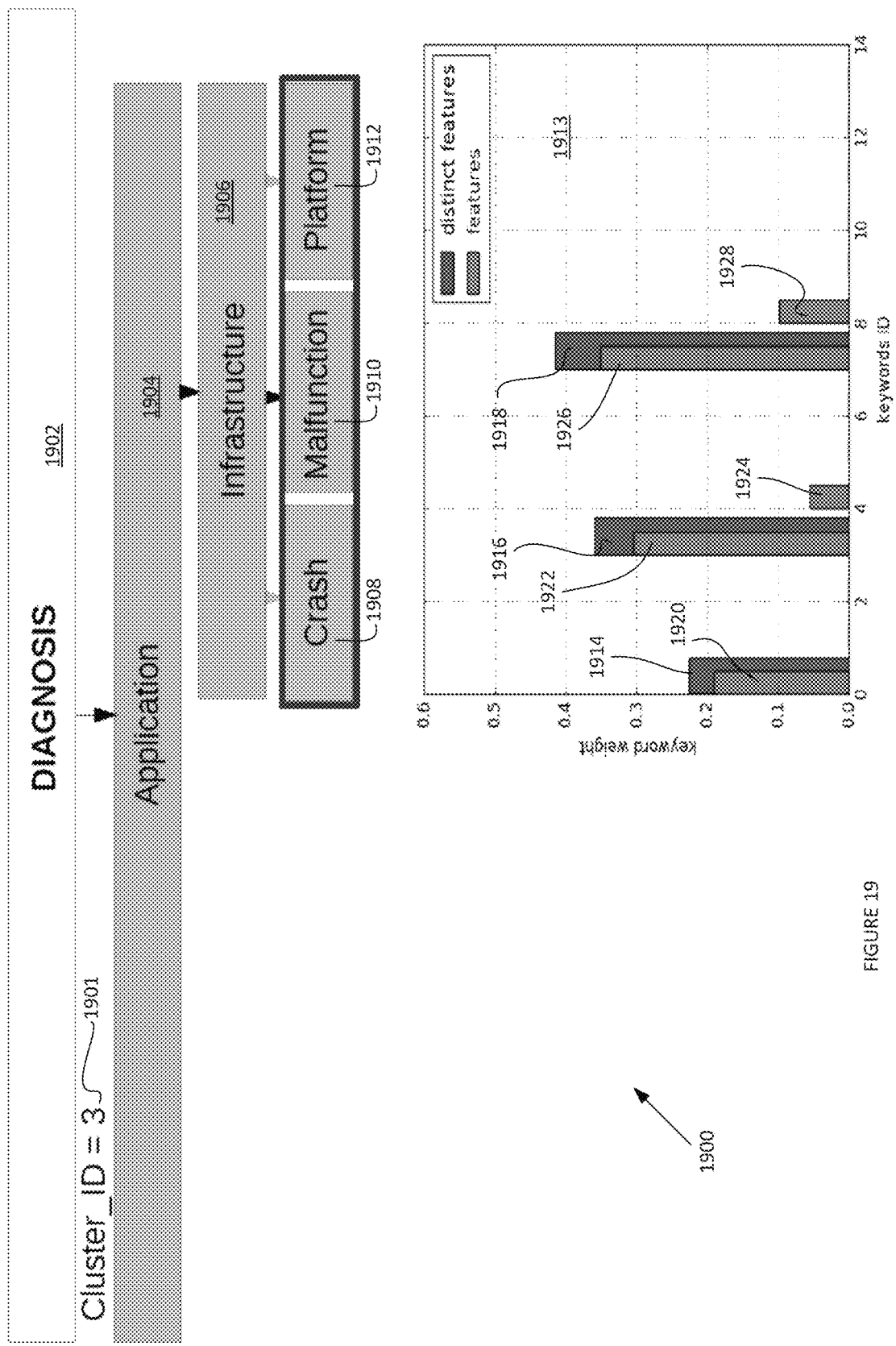

FIG. 19 illustrates another exemplary Taxonomy Branch 1900 and its Cluster Fingerprint 1913 associated with Cluster_ID=3 1901. Here the Taxonomy Branch 1900 comprises root DIAGNOSIS 1902/Application 1904/Infrastructure 1906/Crash 1908, Malfunction 1910, and Platform 1912. As shown, cluster fingerprint 1913 comprises distinct features 1914, 1916, and 1918 and features 1920, 1922, 1924, 1926, 1928.

Figure 20:
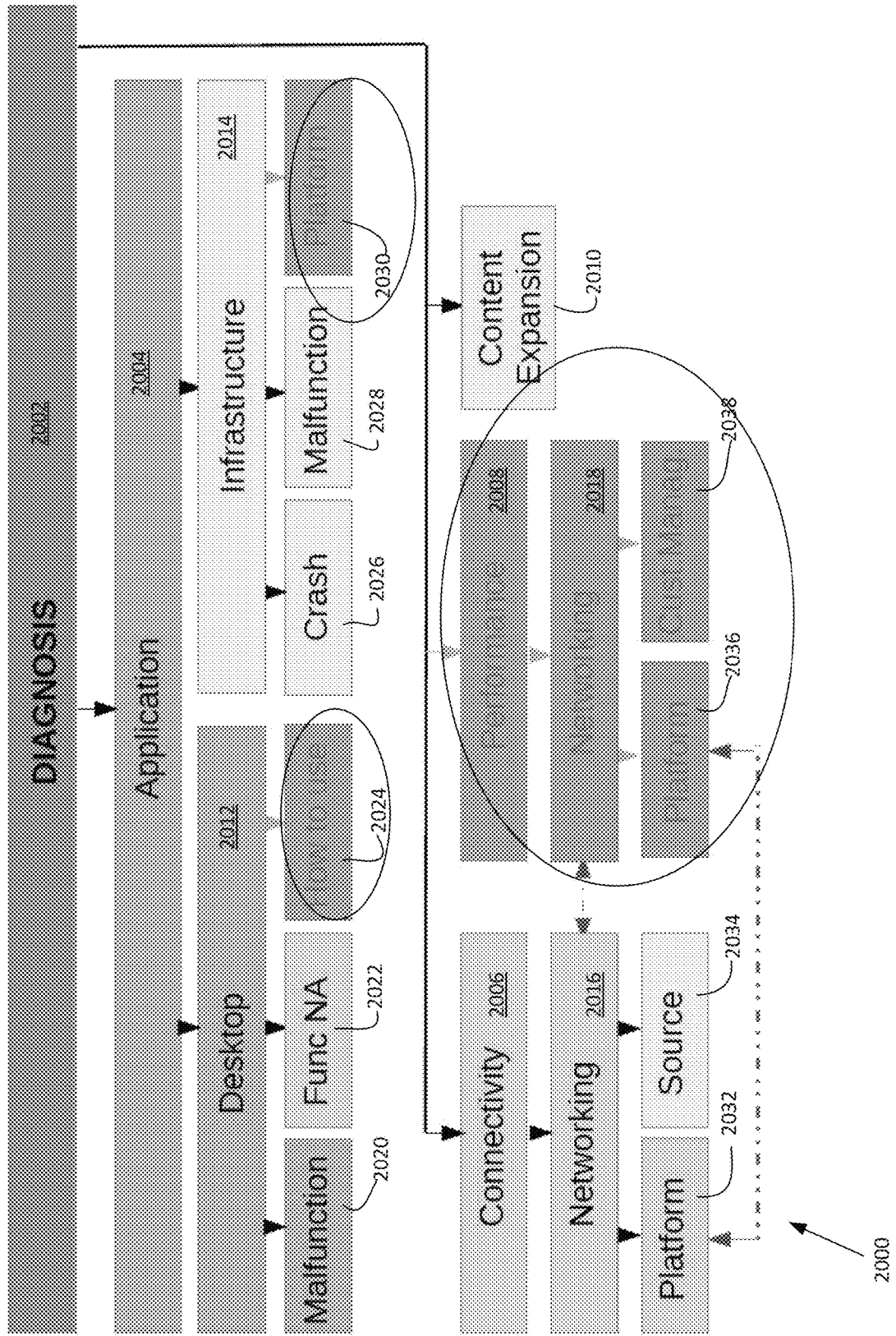

FIG. 20 illustrates a Derived Diagnosis Taxonomy 2000 summarizing all derived clusters and their relevant taxonomy branches shown at FIGS. 14-19. In this example, the taxonomy has a high level or layer root DIAGNOSIS 2002, followed by sub-layer comprising Application 2004, Connectivity 2006, Performance 2008, and Content Expansion 2010. The next level or layer down comprises Desktop 2012, Infrastructure 2014, Networking 2016, and Networking 2018. The next layer down comprises Malfunction 2020, Func NA 2022, How to use 2024, Crash 2026, Malfunction 2028, Platform 2030, Platform 2032, Source 2034, Platform 2036, and Cust. Manag. 2038. The elements shown encircled represent taxonomy branches with relatively lower numbers of cases (cf. FIG. 8 and FIG. 20), which are not fully detected or found and are not linked to the other branches that are included in the test taxonomy 1300.

Figure 21:
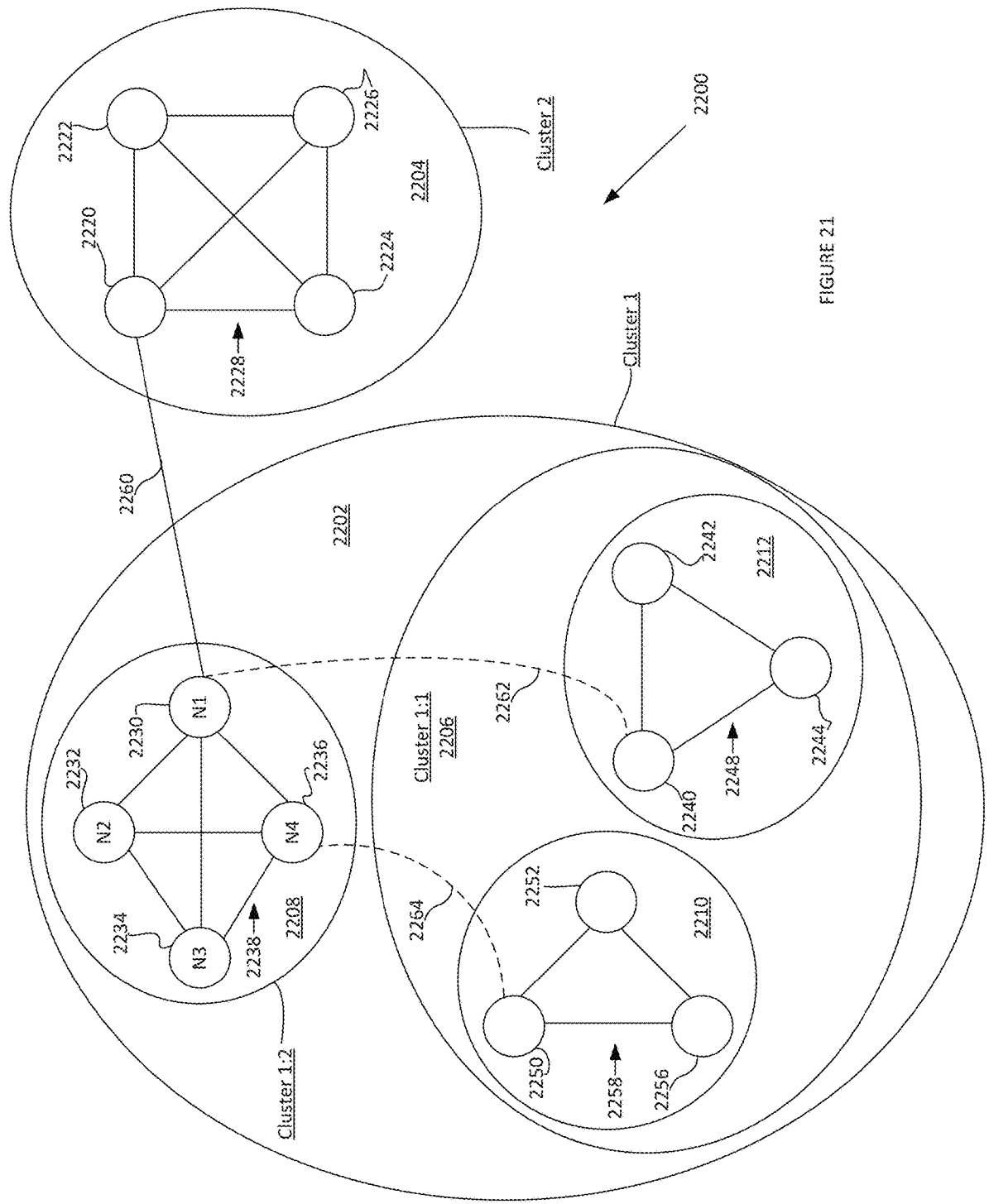
FIG. 21 is a cluster diagram showing hierarchical clustering in accordance with the present invention.

FIG. 21 illustrates a cluster network 2200 including cluster_1 2202 and cluster_2 2204. Cluster_1 2202 includes sub-cluster 1:2 2208 and sub-cluster 1:1 2206. Sub-cluster 1:1 2206 includes sub-sub-clusters 2210 and 2212. Each cluster and sub-cluster is made up of a set of nodes, for example Nodes N1-N4 2230-2236 and links or edges 2238. As shown, solid link 2260 represents a determined relevance link connecting cluster_2 2204 with sub_cluster 1:2 and cluster_1 2202. Hashed lines 2264 and 2262 represent relatively weak links connecting sub-sub-clusters 2210 and 2212 with sub-cluster 1:2 2208 of sub-cluster 1:1 2206.

Figure 22:
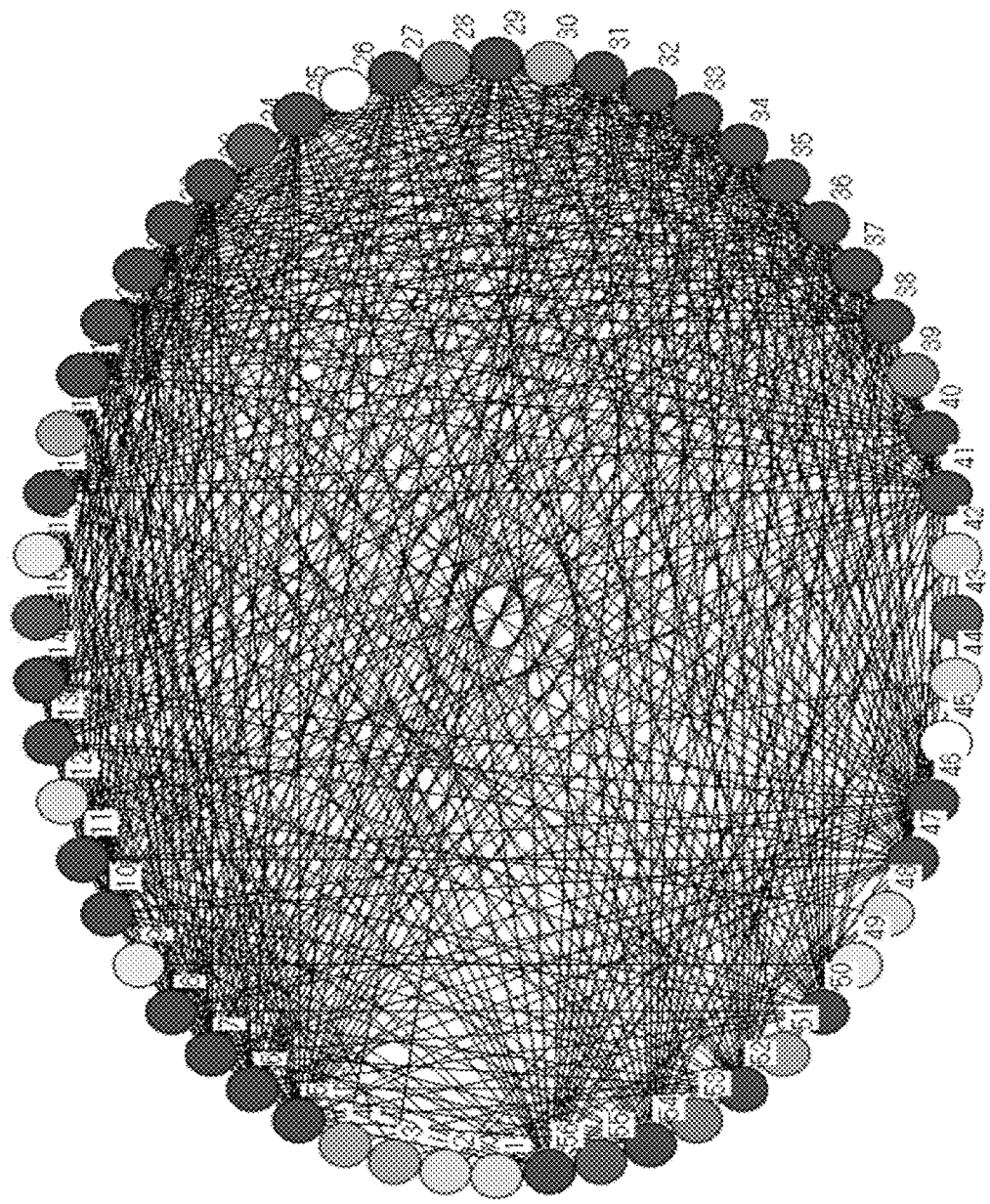
FIGS. 22-23 and 25-26 illustrate examples for hierarchical clustering in cases in similarity domain.
Figure 23:
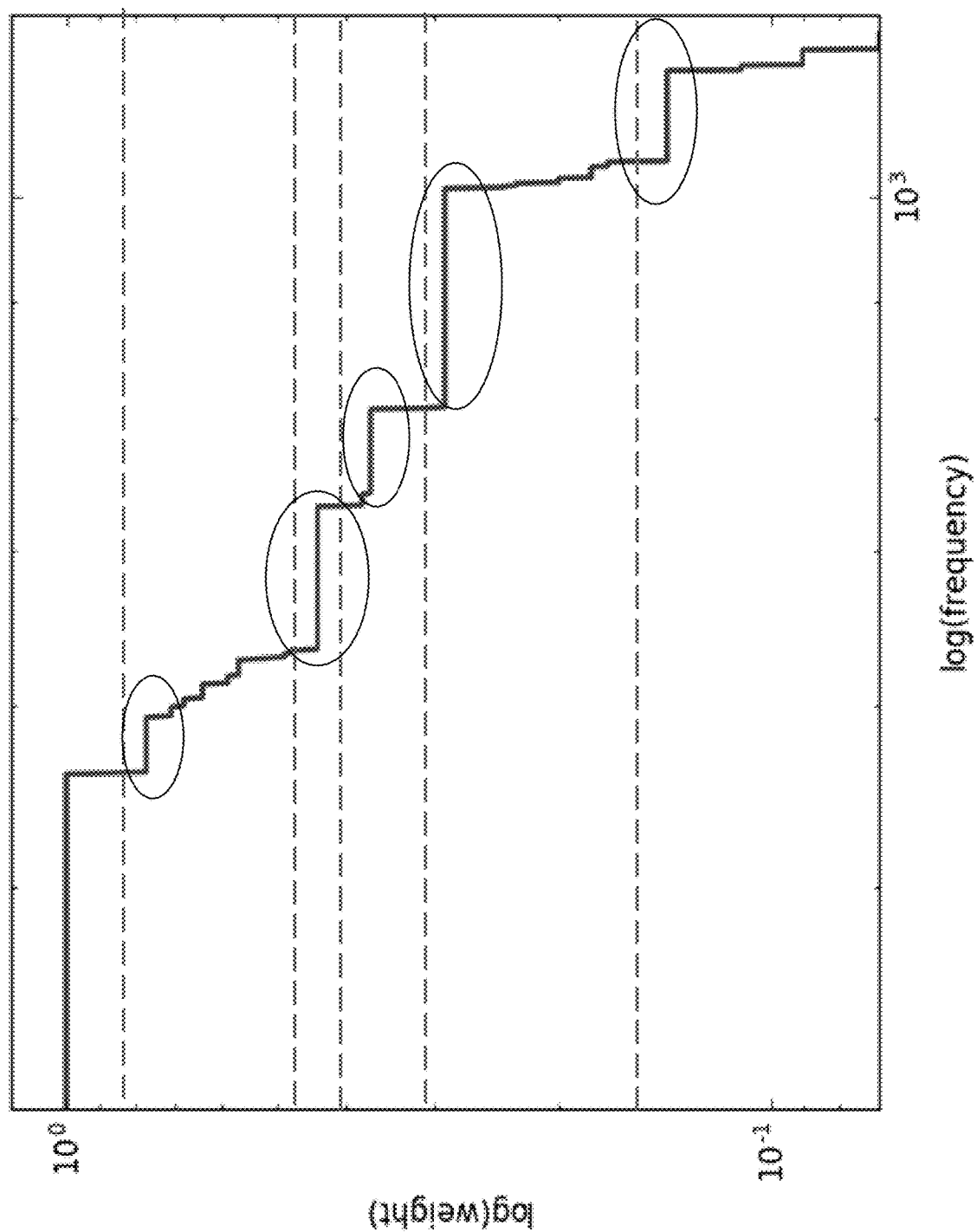
Figure 24:
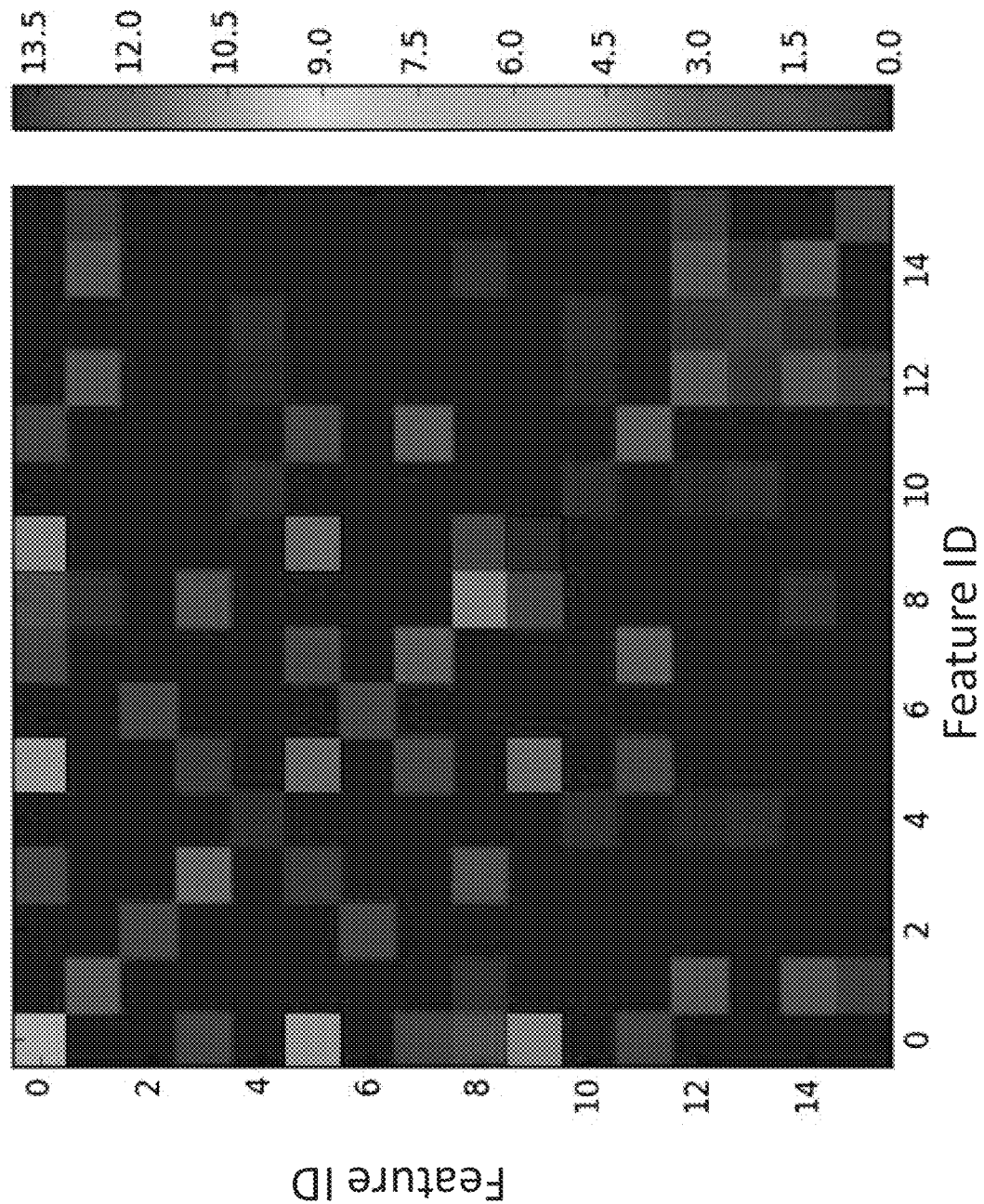
FIGS. 24 and 27-28 illustrate examples for clustering and taxonomy extraction in features space domain.
Figure 27:
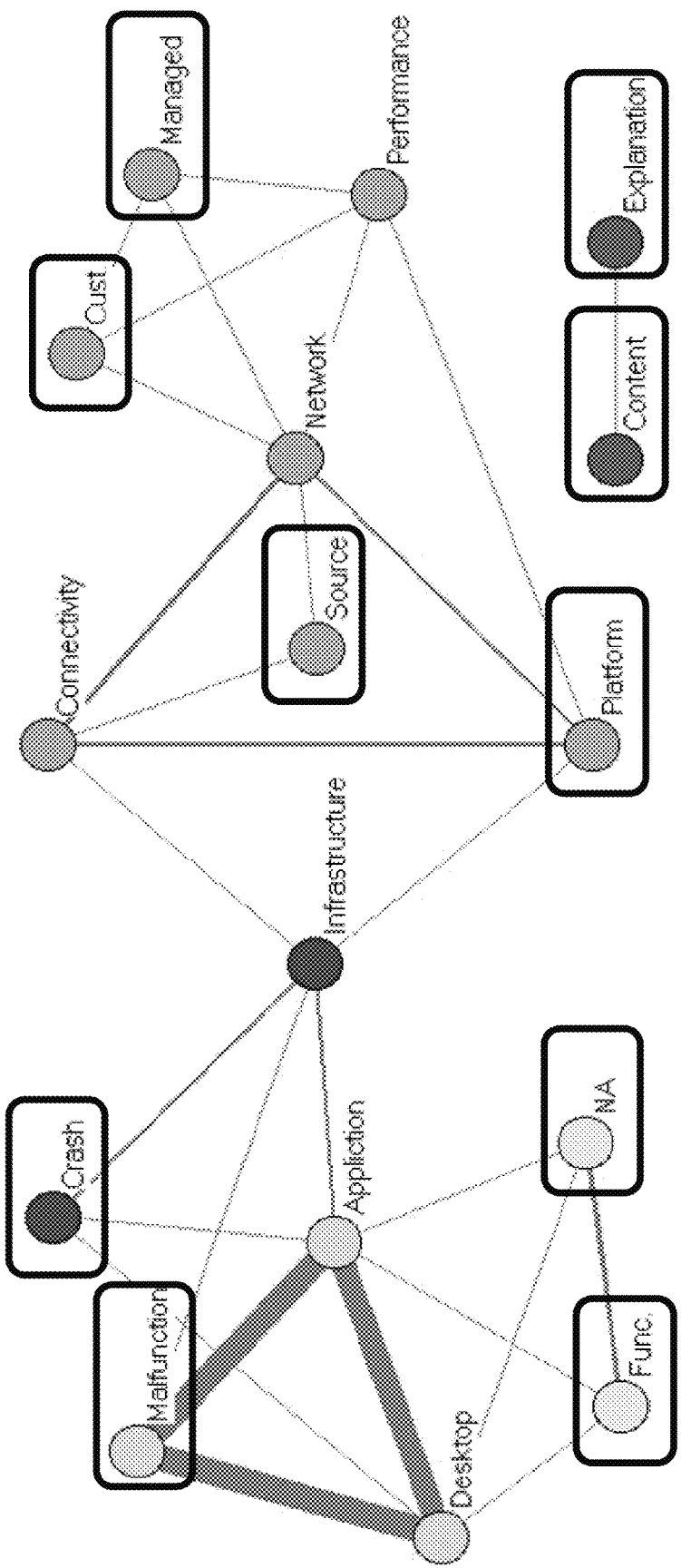
Figure 28:
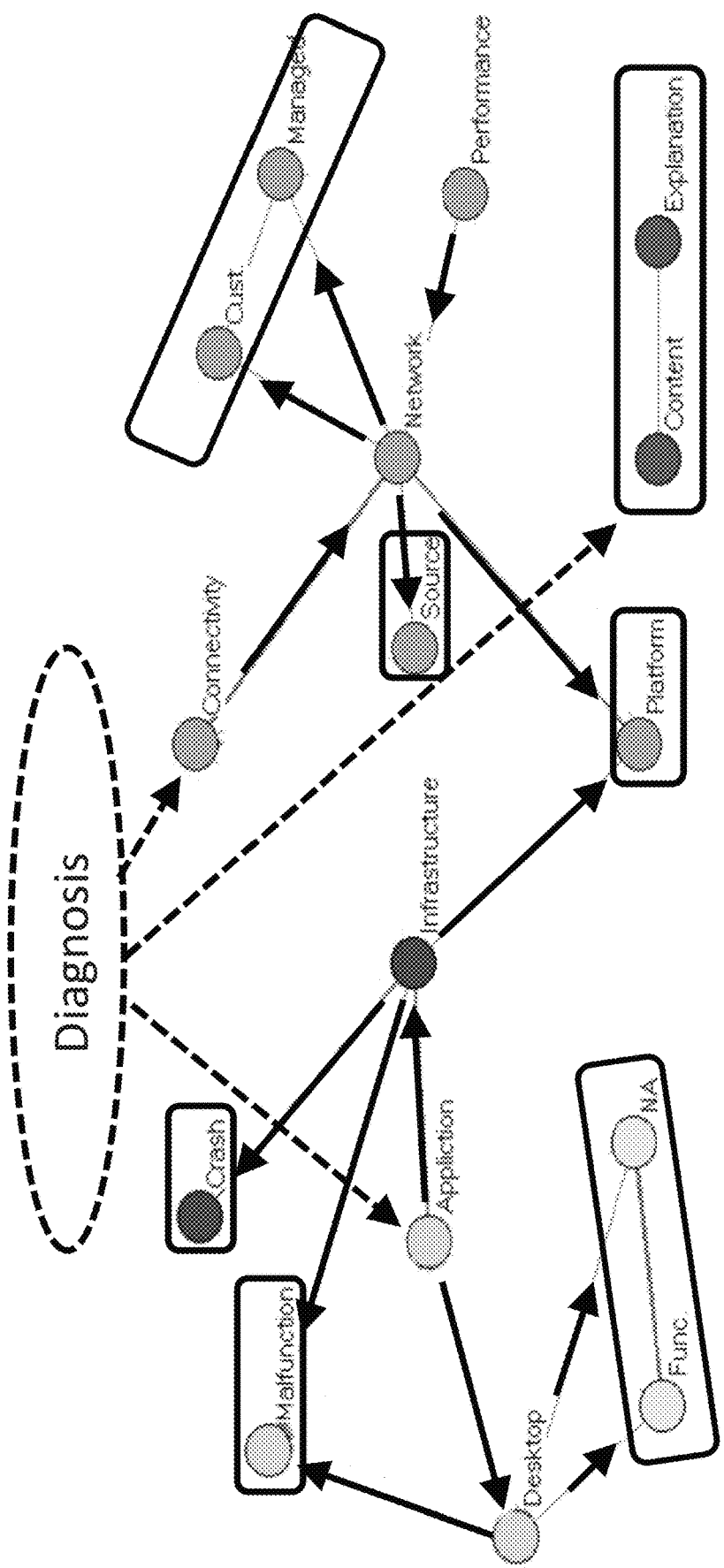
Figure 29:
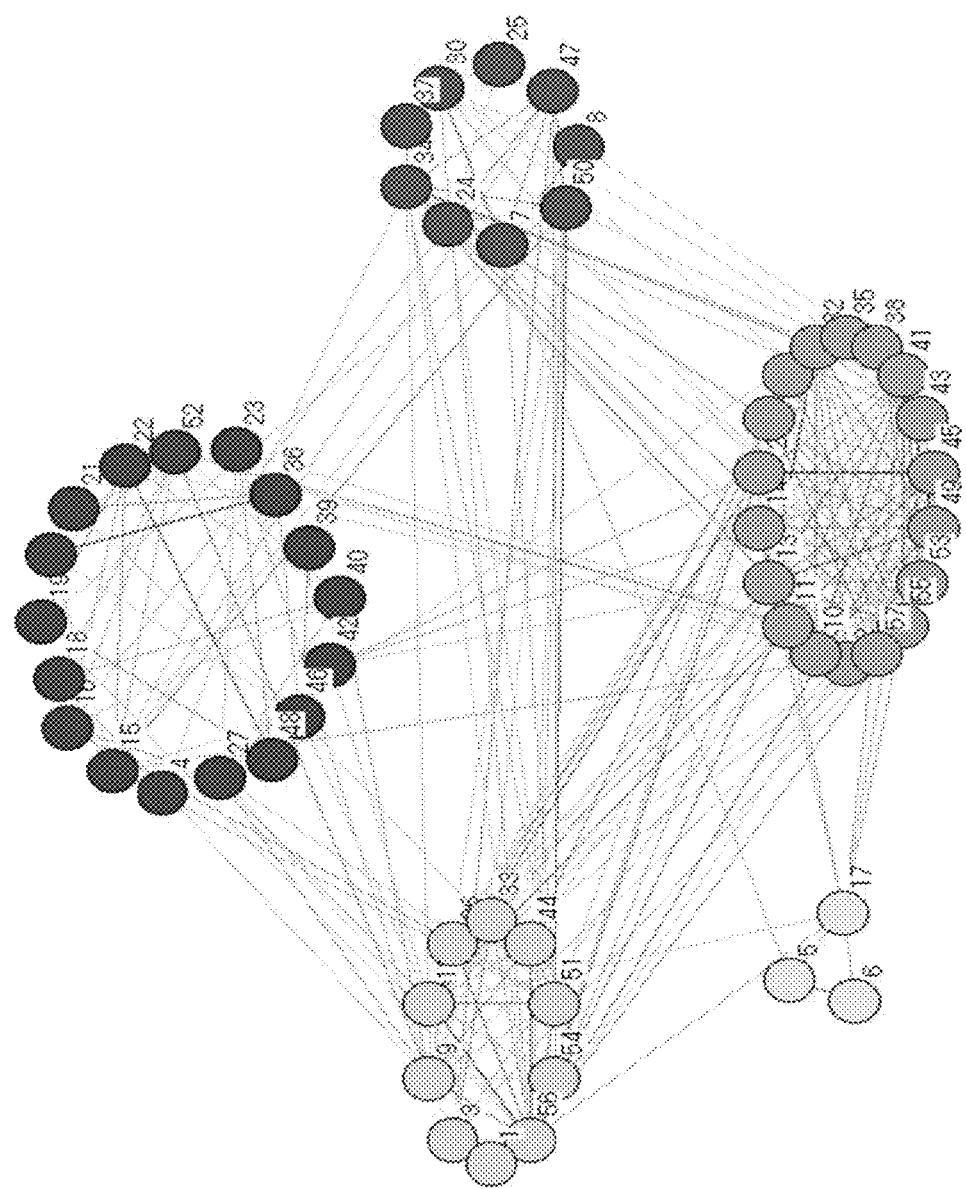
FIGS. 29-30 illustrate details and examples for cross-learning and recommendations.
Figure 30:
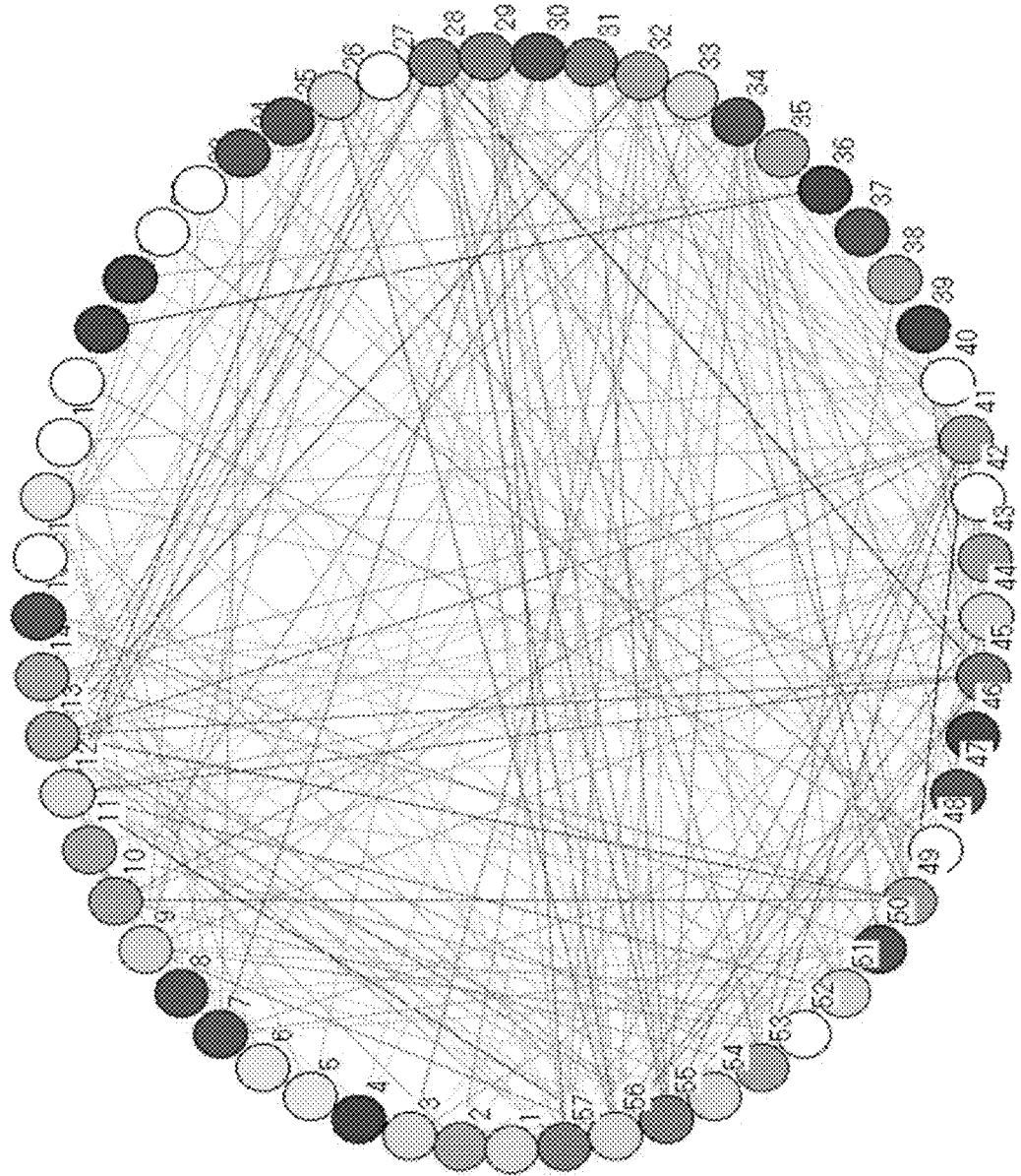

FIGS. 22-30 represent practical examples generated form a data query executed over a sample database. FIGS. 22, 23, 25, and 26 illustrate examples for hierarchical clustering in cases in similarity domain. FIGS. 24, 27, and 28 illustrate examples for clustering and taxonomy extraction in features space domain. FIGS. 29-30 and 22 illustrated details and examples for cross-learning and recommendations.

The PSCC 3/PKD 2 may be used to build taxonomy in two ways using: 1) Case-Similarity domain and 2) Feature domain. In the both domains the system uses natural language processing techniques and hierarchical unsupervised clustering as outlined at FIGS. 4-6. FIGS. 22, 23, 25, and 26 illustrate examples for hierarchical clustering in case-similarity domain. Case-similarity matrix or a relevant netlist may be generated in this process. FIG. 22 illustrates an exemplary unsupervised hierarchical clustering for cases for a Diagnosis field using a weighted adjacency (connectivity) matrix. Cases are selected based on a query, e.g., entered by an agent 32 upon chat and description of symptoms from a user 12. Note that this figure is also used below in connection with discussion on cross-learning with reference to FIGS. 29-30. In FIG. 22, a hierarchical clustering is achieved with clusters shown grouped by nodes of like colors—note an alternative representation of clustering by groups of like colored nodes is also illustrated at FIG. 29.

FIG. 23 is a chart illustrating a weight distribution for Diagnosis topic similarity network. As discussed above, the PCSS may use the threshold 404:8 to amplify clustering quality. These thresholds may be found by analyzing a weight distribution of a corresponding network, Search for optimal threshold is an expensive computation task. On the other hand, it may be shown that clusters on a network correspond to plateaus at a weight distribution plot. These plateaus may be found by using functional analysis, e.g., by differentiation of a corresponding weight distribution function. Then peaks at these diff-function would allow to find plateaus' locations. Weighting thresholds found by this procedure for the network illustrated at FIG. 22 are shown as dashed lines as log(weight) and ranging from 0 to 1. Applying these thresholds saves a lot computation power allocated for clustering and yields significant breaks and sub-clustering.

Figure 25:
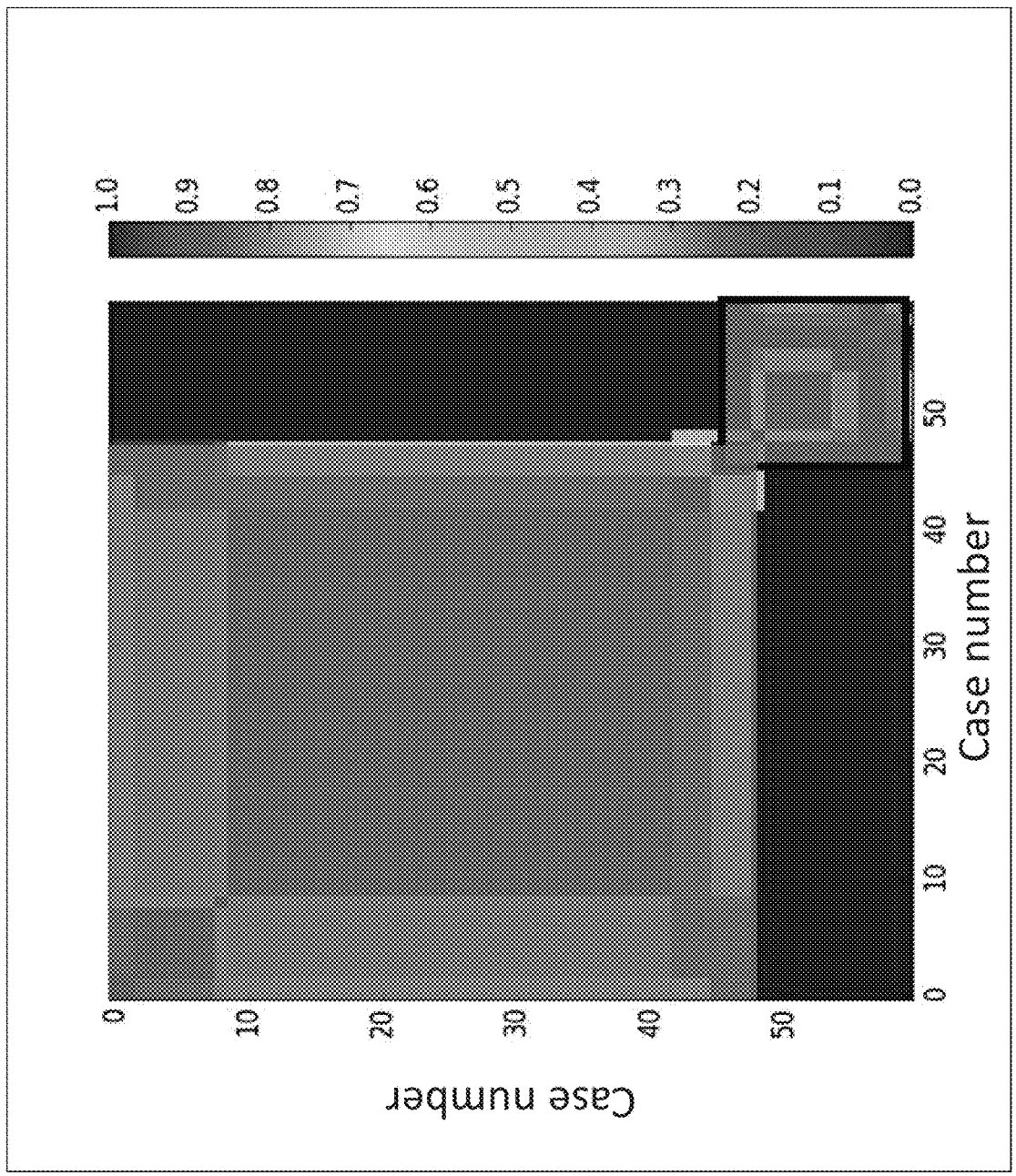
Figure 26:
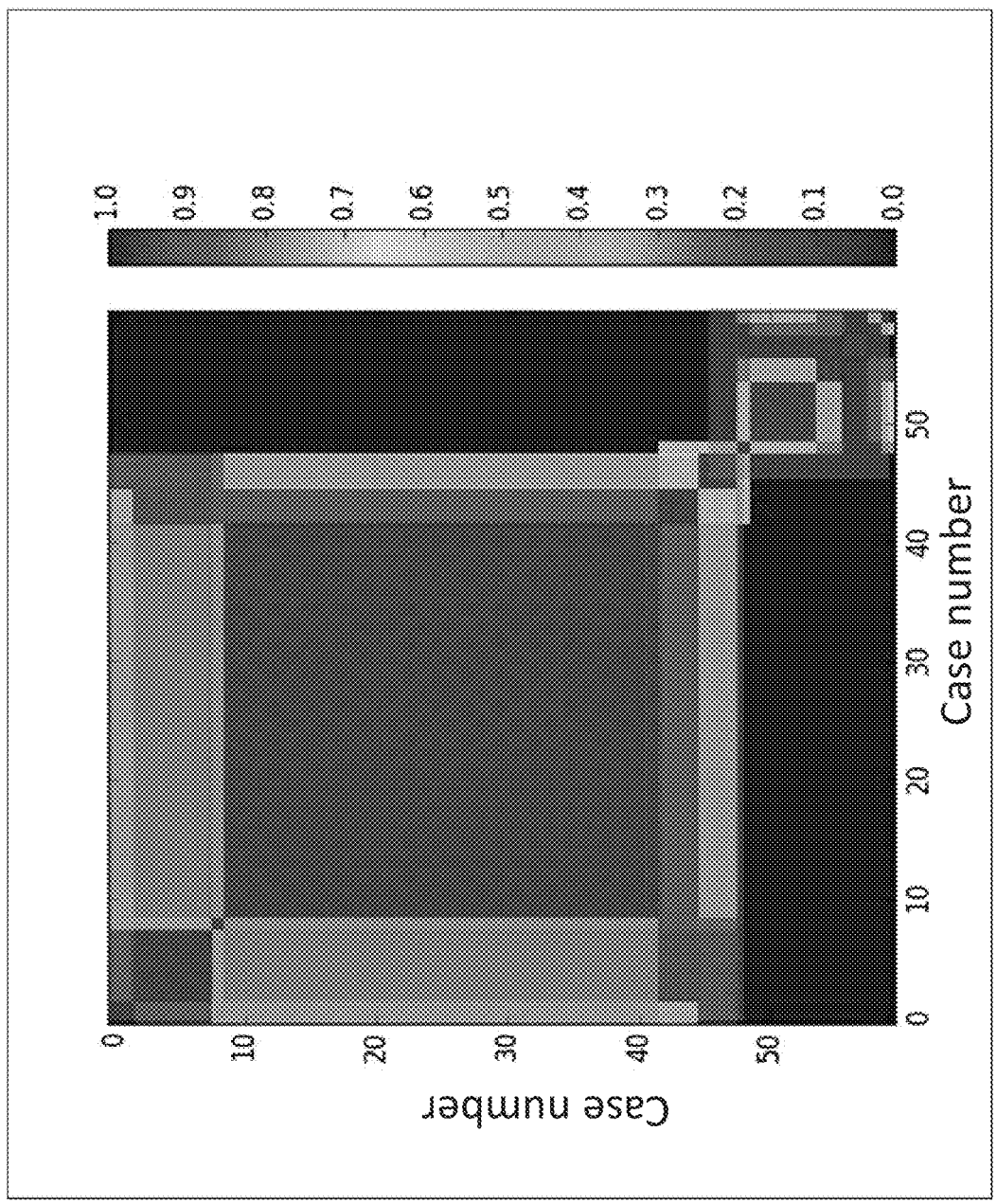

FIG. 24 illustrates a Feature ID-Feature ID co-occurrence matrix, e.g., based on Inverse Document Frequency (IDF), n-gram feature ranking. In this example, features are presented by keywords and low weight is assigned to features with low distinguishing function. FIG. 25 illustrates a result of used unsupervised hierarchical clustering for cases in the Diagnosis field with weighted adjacency (0-1) case number x case number matrix for a set of 60 cases. Clusters are shown as squares on diagonal. As described above, further differentiation and sub-clustering is achieved at hierarchical level two as shown in FIG. 26, again unsupervised hierarchical clustering for cases in the Diagnosis field with weighted adjacency case number×case number matrix for a set of 60 cases with clusters shown as squares on diagonal.

Now with regard to the second approach to build taxonomy in the features space domain, FIGS. 27-28 illustrate examples for clustering and taxonomy extraction in features space domain. FIG. 27 illustrates for the Diagnosis field a features co-occurrence network with links connecting nodes (16 shown) to form clusters (5 shown). In this example, distinct features (10 shown) are shown as nodes with rectangles and colors indicate clusters. FIG. 28 illustrates a taxonomy for Diagnosis field with distinct features (7 shown) again shown with rectangles and colors indicating clusters (5 shown). Similar to case-similarity network, taxonomy extraction starts from detection taxonomy leaves based on distinct features and then followed by reconstruction of taxonomy branches using ranking features for each cluster. Note that here we used IDF ranking only for illustration. Proposed taxonomy reconstruction based on ranked features is the generic method and of not limited only to IDF.

PSCC 2/PKD 3 may utilize cross-content or cross-domain learning. For instance, features extraction 4, building network 5, discovery engine (unsupervised clustering) 6, and cluster tagging engine 7 may be used to refine the overall process of PSCC 2/PKD 3. In one example, two cases having connections or links in one or more topics or fields, e.g., Description, Symptom, Question, Recommendation, may be considered for added similarity relevance and the emphasis may depend in whole or in part on the particular topics or fields linked. PSCC 2/PKD 3 are configured to process cases coming with multiple fields describing customers problems and PCSS agents solutions (Product, Question, Description, Symptoms, Diagnosis, Resolution . . . ). For instance, the suggested Recommendation method includes Clustering, Training, and Recommendations. In the context of Clustering, the PSCC 2/PKD 3 are configured to provide unsupervised clustering for a selected set of cases (e.g., based on user inquiry/agent queries) for selected fields (e.g., clustering for Description fields, and Diagnosis fields). In the context of Training, PKD 2/PCSS 3 are configured to make features (keywords) mapping between cases Description and its Diagnosis, make mapping between Description clusters and Diagnosis clusters, and build relevant transition matrices between Description and Diagnosis features. In the context of Recommendations, given features (keywords) for a new case Description, the PKD 2/PCSS 3 are configured to suggest the most relevant features (keywords) from Diagnosis and to suggest a ranked list of Diagnostics for the new case.

Now with reference to FIGS. 29-30 and 22, FIG. 29 illustrates unsupervised clustering for cases utilizing the Description field or topic with five clusters shown. FIG. 30 is an alternative representation of unsupervised clustering for Description as shown in FIG. 29. FIG. 22 illustrates clustering for the Diagnosis field. FIGS. 30 and 22 illustrate cross-learning mapping of clusters between Description and Diagnosis fields or topics. In connection with Training, make features (keywords) mapping between cases Description and its Diagnosis. In connection with Recommendations, given features (keywords) for a new case Description, suggest the most relevant features (keywords) from Diagnosis and suggest a ranked list of Diagnostics for the new case. In this manner cross-learning is used to map clusters between fields.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

I claim:

1. A computer-based Product Customer Support System ("PCSS") comprising one or more memory components and one or more processors in communication over one or more communications networks with a plurality of remote customer-operated devices to provide a product resource, the PCSS comprising:

a Product Knowledge Database ("PKD") comprising a set of known solution records and a set of historical data records, the set of known solution records being related to at least on product and comprising product resolution data, and the set of historical data records being related at least one product and comprising product inquiry data;

a server system adapted to communicate with the PKD and with remote customer-operated devices and comprising a set of processors, and a set of memory components adapted to store code executable by the set of processors;

a user interface adapted to receive inputs from users and to present users with agent-generated prompts, the inputs and prompts related to a product inquiry, wherein the user interface is adapted to receive product related queries as user inputs, to present to users agent-generated questions related to the received queries as prompts for further information, and to receive user responses to the agent-generated questions;

a tagging engine adapted to identify, extract and tag data from at least one of the inputs and prompts and generate a set of tagged inquiry data, the tagged inquiry data including a service issue feature identified and extracted from the product inquiry and tagged by the tagging engine;

a clustering engine adapted to perform unsupervised hierarchical clustering at a plurality of hierarchical levels in at least one of the following domains: documents-similarity domain; features domain; and joint clustering, the clustering engine further adapted to derive a diagnosis taxonomy for addressing the service issue feature identified and tagged by the tagging engine by generating a set of clusters based on comparing the tagged inquiry data with at least one of known solution records, historical data records, clusters of known solution records and historical data records, the diagnosis taxonomy comprising at least a first primary level topic set representing a first node of a cluster and a second level topic set representing a secondary level set of features representing a set of sub-nodes of the cluster connected with the first node by a set of edges, wherein the cluster comprises a set of nodes and sub-nodes related to the service issue feature, wherein the clustering engine is adapted to perform similarity and feature scoring to determine if the tagged inquiry data is closely associated with at least one of an existing record, document, cluster of records, and cluster of documents stored in the PKD, wherein the PKD receives and stores the tagged inquiry data and generates a new historical data record including at least one topic comprised of at least one of: customer inquiry data, agent question data, user response data, product data, resolution data, and recommendation data; and a recommendation engine adapted to generate for output a set of documents including recommendations responsive to the product inquiry; and wherein the user interface includes elements adapted to present a set of suggested recommendations from which the user may select as being responsive to the user inquiry.

2. The PCSS of claim 1, wherein the clustering engine is adapted to connect at least one of documents, product data, problem data, solution data, recommendation data, tagging and classification data, and other product related information into a cluster network.

3. The PCSS of claim 2, wherein the clustering engine is further adapted to process an additional set of documents to make additional associations for storing in the PKD, and wherein at least one of the additional set of documents are stored in the PKD as historical data records and available for use in clustering by the clustering engine.

4. The PCSS of claim 1 further comprising a discovery engine adapted to extract and tag keyword data to allow analyst-type users to classify and navigate over at least one of historical data records and known solution records to identify trends related to user inquiries, and adapted to provide at least one of cross-mapping and cross-learning using mapping extracted taxonomies from different topical domains associated with at least one of historical data records and known solution records.

5. The PCSS of claim 1, wherein the tagged inquiry data includes tagged data derived from the agent-generated questions and/or the received user responses.

6. The PCSS of claim 1, further comprising an adaptive network pruning module adapted to amplify clustering based on adaptive thresholding.

7. The PCSS of claim 1, wherein the clustering engine if further adapted to provide taxonomy extraction based on at least one of documents-similarity domain and features domain.

8. The PCSS of claim 1, wherein the tagging engine is adapted to use natural language processing techniques to identify, extract and tag data from at least one of the inputs and prompts and generate the set of tagged inquiry data.

9. The PCSS of claim 1, wherein the tagging engine is adapted to use term frequency (tf), inverse term frequency (idf), and/or tf-idf functions to identify, extract and tag data from at least one of the inputs and prompts and generate the set of tagged inquiry data.

10. The PCSS of claim 1, wherein the PKD is integrated with or interconnected with a CRM/ERP system.

11. The PCSS of claim 1, wherein the PKD includes an existing knowledge database having data related to an existing first set of products, and the PCSS is adapted to use features and similarities based on at least one of tagged information and known solutions to generate a set of known solution records for use with a new product not included in the existing first set of products.

* * * * *